(12) United States Patent
Dorsey

(10) Patent No.: US 7,219,101 B2
(45) Date of Patent: May 15, 2007

(54) METHOD AND COMPUTER SYSTEM FOR CUSTOMIZING COMPUTER APPLICATIONS BY STORING THE CUSTOMIZATION SPECIFICATION AS DATA IN A DATABASE

(75) Inventor: Paul R. Dorsey, Colonia, NJ (US)

(73) Assignee: Dulcian, Inc., New York, NY (US)

( * ) Notice: Subject to any disclaimer, the term of this patent is extended or adjusted under 35 U.S.C. 154(b) by 1342 days.

(21) Appl. No.: 09/928,167

(22) Filed: Aug. 11, 2001

(65) Prior Publication Data
US 2006/0155710 A1 Jul. 13, 2006

Related U.S. Application Data

(60) Provisional application No. 60/225,075, filed on Aug. 14, 2000.

(51) Int. Cl.
*G06F 17/00* (2006.01)
(52) U.S. Cl. .................. 707/101; 707/102; 707/103 R; 707/103 Z; 707/103 X
(58) Field of Classification Search ..................... None
See application file for complete search history.

(56) References Cited

U.S. PATENT DOCUMENTS

| 6,182,277 | B1 * | 1/2001 | DeGroot et al. | ............ 717/115 |
| 6,546,397 | B1 * | 4/2003 | Rempell | ..................... 707/102 |
| 2002/0038451 | A1 * | 3/2002 | Tanner et al. | ................ 717/105 |
| 2004/0148307 | A1 * | 7/2004 | Rempell | ..................... 707/102 |

* cited by examiner

*Primary Examiner*—Sana AL-Hashemi
(74) *Attorney, Agent, or Firm*—Arthur M. Peslak, Esq.

(57) ABSTRACT

The present invention relates to a method and computer system to store customization specifications for computer software as data in a database. The customization information includes labels, error messages, help, security, and client preferences, such as display preferences. Because this information is stored as data, it is possible for a user to maintain multilingual labels, different error messages, context-sensitive help messages (both error and help messages are also multilingual), security, and user preferences, such as display preferences, as data, rather than placing a request for a computer applications developer to modify procedural code.

6 Claims, 41 Drawing Sheets

| DEF_OBJ | | | | |
|---|---|---|---|---|
| DEF_OBJ_ID | NAME_TX | DEF_OBJ_ID_RFK | TOOL_CD | DESCR_TX |
| 354 | FORM | | FORMS | AN ORACLE DEVELOPER FORM'S FORM. |
| 355 | BLOCK | 354 | FORMS | AN ORACLE DEVELOPER FORM'S BLOCK. |
| 356 | WINDOW | 354 | FORMS | AN ORACLE DEVELOPER FORM'S WINDOW. |
| 357 | CANVAS | 356 | FORMS | AN ORACLE DEVELOPER FORM'S CANVAS. |
| 358 | TAB PAGE | 357 | FORMS | AN ORACLE DEVELOPER FORM'S TAB PAGE. |
| 359 | VISUAL ATTRIBUTE | 354 | FORMS | AN ORACLE DEVELOPER FORM'S VISUAL ATTRIBUTE. |
| 360 | TEXT ITEM | 355 | FORMS | AN ORACLE DEVELOPER FORM'S TEXT ITEM. |
| 361 | DISPLAY ITEM | 355 | FORMS | AN ORACLE DEVELOPER FORM'S DISPLAY ITEM. |
| 362 | CHECKBOX | 355 | FORMS | AN ORACLE DEVELOPER FORM'S CHECKBOX. |
| 363 | BUTTON | 355 | FORMS | AN ORACLE DEVELOPER FORM'S BUTTON. |
| 377 | RADIO GROUP | 355 | FORMS | AN ORACLE DEVELOPER FORM'S RADIO GROUP. |

TRANSACTION

| ATTRIBUTE NAME | SEQ. | OPT. | FORMAT | LENGTH | DECIMAL |
|---|---|---|---|---|---|
| TRANSACTION_CD | 10 | N | VARCHAR2 | 7 | |
| NAME_TX | 20 | N | VARCHAR2 | 40 | |
| DESCR_TX | 30 | Y | VARCHAR2 | 2000 | |

FIG. 1B

TRANSACTION_DTL

| ATTRIBUTE NAME | SEQ. | OPT. | FORMAT | LENGTH | DECIMAL |
|---|---|---|---|---|---|
| TRANSACTION_DTL_ID | 10 | N | VARCHAR2 | 7 | |
| TRANSACTION_CD_FK | 20 | N | VARCHAR2 | 7 | |
| TRANSACTION_DTL_ID_RFK | 30 | N | VARCHAR2 | 7 | |
| DATE_TX | 40 | N | DATE | | |

FIG. 1C

TRANSACTION

| TRANSACTION_CD | NAME_TX | DESCR_TX |
|---|---|---|
| BUY_PROD | BUY PRODUCT TRANSACTION | THIS TRANSACTION RELATES TO A CUSTOMER BUYING A PRODUCT. |
| SELL_PROD | SELL PRODUCT TRANSACTION | THIS TRANSACTION RELATES TO A VENDOR SELLING A PRODUCT. |

FIG. 1D

TRANSACTION_DETAIL

| TRANSACTION_DTL_ID | TRANSACTION_CD_FK | DATE_DT |
|---|---|---|
| 1 | BUY_PROD | 11/01/1999 |
| 2 | BUY_PROD | 11/05/1999 |
| 3 | SELL_PROD | 11/01/1999 |

FIG. 1E

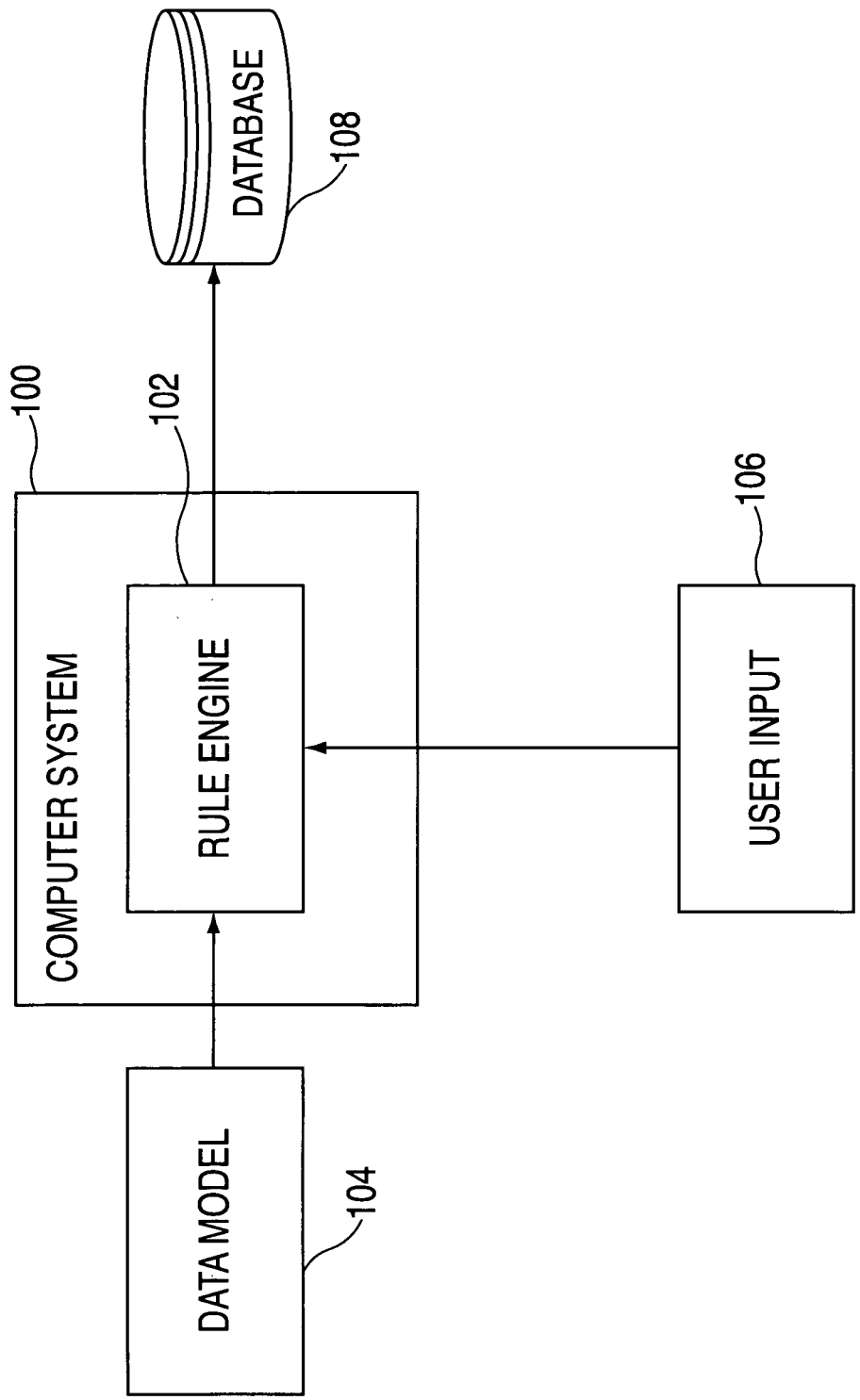

TOOL

| ATTRIBUTE NAME | SEQ. | OPT. | FORMAT | LENGTH | DECIMAL |
|---|---|---|---|---|---|
| TOOL_CD | 10 | N | VARCHAR2 | 200 | |
| NAME_TX | 20 | Y | VARCHAR2 | 40 | |
| DESCR_TX | 30 | Y | VARCHAR2 | 2000 | |

FIG. 4A

DEF_OBJECT

| ATTRIBUTE NAME | SEQ. | OPT. | FORMAT | LENGTH | DECIMAL |
|---|---|---|---|---|---|
| DEF_OBJECT_ID | 10 | N | NUMBER | 10 | |
| NAME_TX | 20 | Y | VARCHAR2 | 40 | |
| DESCR_TX | 30 | Y | VARCHAR2 | 2000 | |

FIG. 4B

SYSTM

| ATTRIBUTE NAME | SEQ. | OPT. | FORMAT | LENGTH | DECIMAL |
|---|---|---|---|---|---|
| SYSTM_ID | 10 | N | NUMBER | 10 | |
| NAME_TX | 20 | Y | VARCHAR2 | 40 | |
| PASSWORD_NR | 30 | Y | NUMBER | 10 | |
| SCHEMA_CD | 40 | Y | VARCHAR2 | 200 | |
| VERSN_NR | 50 | Y | NUMBER | 10 | |
| DESCR_TX | 60 | Y | VARCHAR2 | 2000 | |

FIG. 4C

VALID_TOOL

| ATTRIBUTE NAME | SEQ. | OPT. | FORMAT | LENGTH | DECIMAL |
|---|---|---|---|---|---|
| CREAT_BY | 10 | Y | VARCHAR2 | 200 | |
| CREAT_DT | 20 | Y | DATE | | |

FIG. 4D

OBJ

| ATTRIBUTE NAME | SEQ. | OPT. | FORMAT | LENGTH | DECIMAL |
|---|---|---|---|---|---|
| OBJ_ID | 10 | N | NUMBER | 10 | |
| NAME_TX | 20 | Y | VARCHAR2 | 40 | |
| DESCR_TX | 30 | Y | VARCHAR2 | 2000 | |

FIG. 4E

ABSTR_OBJ

| ATTRIBUTE NAME | SEQ. | OPT. | FORMAT | LENGTH | DECIMAL |
|---|---|---|---|---|---|
| ABSTR_OBJECT_ID | 10 | N | NUMBER | 10 | |
| NAME_TX | 20 | Y | VARCHAR2 | 40 | |
| DESCR_TX | 30 | Y | VARCHAR2 | 2000 | |

FIG. 4F

LANG

| ATTRIBUTE NAME | SEQ. | OPT. | FORMAT | LENGTH | DECIMAL |
|---|---|---|---|---|---|
| LANG_CD | 10 | N | VARCHAR2 | 200 | |
| NAME_TX | 20 | Y | VARCHAR2 | 40 | |
| DESCR_TX | 30 | Y | VARCHAR2 | 2000 | |

FIG. 4G

LABEL_SET

| ATTRIBUTE NAME | SEQ. | OPT. | FORMAT | LENGTH | DECIMAL |
|---|---|---|---|---|---|
| LABEL_SET_CD | 10 | N | VARCHAR2 | 200 | |
| NAME_TX | 20 | Y | VARCHAR2 | 40 | |
| DESCR_TX | 30 | Y | VARCHAR2 | 2000 | |

FIG. 4H

DOMAIN

| ATTRIBUTE NAME | SEQ. | OPT. | FORMAT | LENGTH | DECIMAL |
|---|---|---|---|---|---|
| DOMAIN_CD | 10 | N | VARCHAR2 | 200 | |
| NAME_TX | 20 | Y | VARCHAR2 | 40 | |
| DEFLT_TX | 30 | Y | VARCHAR2 | 200 | |
| DEFLT_NR | 40 | Y | NYMBER | 10 | |
| DEFLT_DT | 50 | Y | DATE | | |
| DATA_TYPE_CD | 60 | Y | VARCHAR2 | 200 | |
| LNGTH_NR | 70 | Y | NUMBER | 10 | |
| MAX_NR | 80 | Y | NUMBER | 10 | |
| MIN_NR | 90 | Y | NUMBER | 10 | |
| PRCSN_NR | 100 | Y | NUMBER | 10 | |
| VALID_RULE_TX | 110 | Y | VARCHAR2 | 2000 | |
| DESCR_TX | 120 | Y | VARCHAR2 | 2000 | |
| Z_DOMAIN_CD | 130 | Y | VARCHAR2 | 200 | |

FIG. 4I

DEF_OBJ_ATTR

| ATTRIBUTE NAME | SEQ. | OPT. | FORMAT | LENGTH | DECIMAL |
|---|---|---|---|---|---|
| DEF_OBJ_ATTR_ID | 10 | N | NUMBER | 10 | |
| ABST_OBJ_IDF_YN | 20 | Y | VARCHAR2 | 1 | |
| NAME_TX | 30 | Y | VARCHAR2 | 40 | |
| DESCR_TX | 40 | Y | VARCHAR2 | 2000 | |

FIG. 4J

OBJ_VALUE

| ATTRIBUTE NAME | SEQ. | OPT. | FORMAT | LENGTH | DECIMAL |
|---|---|---|---|---|---|
| OBJ_VALUE_ID | 10 | N | NUMBER | 10 | |
| VALUE_NR | 20 | Y | NUMBER | 10 | |
| VALUE_TX | 30 | Y | VARCHAR2 | 2000 | |

TOOL

| TOOL_CD | NAME_TX | DESCR_TX |
|---|---|---|
| FORMS | ORACLE FORMS | ORACLE DEVELOPERS' SCREEN APPLICATION PRODUCT. |
| REPORTS | ORACLE REPORTS | ORACLE DEVELOPERS' REPORT APPLICATION PRODUCT |
| SQL SERVER | MICROSOFT SQL SERVER | MICROSOFT DATABASE DEVELOPERS DATABASE MANAGEMENT SYSTEM PRODUCT |

FIG. 7A

DEF_OBJ

| DEF_OBJ_ID | NAME_TX | DEF_OBJ_ID_RFK | TOOL_CD | DESCR_TX |
|---|---|---|---|---|
| 354 | FORM | | FORMS | AN ORACLE DEVELOPER FORM'S FORM. |
| 355 | BLOCK | 354 | FORMS | AN ORACLE DEVELOPER FORM'S BLOCK. |
| 356 | WINDOW | 354 | FORMS | AN ORACLE DEVELOPER FORM'S WINDOW. |
| 357 | CANVAS | 356 | FORMS | AN ORACLE DEVELOPER FORM'S CANVAS. |
| 358 | TAB PAGE | 357 | FORMS | AN ORACLE DEVELOPER FORM'S TAB PAGE. |
| 359 | VISUAL ATTRIBUTE | 354 | FORMS | AN ORACLE DEVELOPER FORM'S VISUAL ATTRIBUTE. |
| 360 | TEXT ITEM | 355 | FORMS | AN ORACLE DEVELOPER FORM'S TEXT ITEM. |
| 361 | DISPLAY ITEM | 355 | FORMS | AN ORACLE DEVELOPER FORM'S DISPLAY ITEM. |
| 362 | CHECKBOX | 355 | FORMS | AN ORACLE DEVELOPER FORM'S CHECKBOX. |
| 363 | BUTTON | 355 | FORMS | AN ORACLE DEVELOPER FORM'S BUTTON. |
| 377 | RADIO GROUP | 355 | FORMS | AN ORACLE DEVELOPER FORM'S RADIO GROUP. |

FIG. 7B

SYSTM

| SYSTM_ID | NAME_TX | PASSWORD_NR | SCHEMA_CD | VERSN_NR | DESCR_TX |
|---|---|---|---|---|---|
| 1 | PAYROLL SYSTEM | AMNBC1 | | 3.0 | THIS IS THE PAYROLL SYSTEM. |
| 2 | ABC CORP. | WAT99 | | 2.1 | THIS IS THE ENTIRE INFORMATION SYSTEM FOR ABC CORPORATION. |
| 3 | MARKETING IS | LITN35 | | 1.2 | THIS IS THE MARKETING INFORMATION SYSTEM. |

FIG. 7C

VALID_TOOL

| SYSTM_ID_FK | TOOL_CD_FK | CREAT_BY | CREAT_DT |
|---|---|---|---|
| 1 | FORMS | JOHN SMITH | JANUARY, 29 2000 |
| 2 | FORMS | TOM JONES | JUNE 14, 2000 |
| 2 | REPORTS | TOM JONES | JUNE 14, 2000 |

| 7E-1 |
|------|
| 7E-2 |
| 7E-3 |
| 7E-4 |
| 7E-5 |
| 7E-6 |
| 7E-7 |
| 7E-8 |
| 7E-9 |

FIG. 7E-1

OBJ

| OBJ_ID | NAME_TX | OBJ_ID_RFK | DEF_OBJ_ID_FK | SYSTM_ID_FK | DESCR_TX |
|--------|---------|------------|----------------|-------------|----------|
| 3519 | V_GEN_PARTY_COB_INFO_ROLE_TRAN.ACTIV | 3515 | 362 | 2 | A CHECKBOX NAMED V_GEN_PARTY_COB_INFO_ROLE_TRAN.ACTIV_YN |
| 3520 | SOURCE | 3373 | 355 | 2 | A BLOCK NAMED SOURCE |
| 3521 | W_SOURCE | 3373 | 356 | 2 | A WINDOW NAMED W_SOURCE |
| 3522 | C_SOURCE | 3521 | 357 | 2 | A CANVAS NAMED C_SOURCE |
| 3523 | SOURCE.PARTY_ROLE_ID | 3520 | 360 | 2 | A TEXT ITEM NAMED SOURCE.PARTY_ROLE_ID |
| 3524 | SOURCE.CNTXT_TX | 3520 | 360 | 2 | A TEXT ITEM NAMED SOURCE.CNTXT_TX |
| 3525 | SOURCE.Z_PARTY_CD | 3520 | 360 | 2 | A TEXT ITEM NAMED SOURCE.Z_PARTY_CD |
| 3526 | SOURCE.Z_REL_CD | 3520 | 360 | 2 | A TEXT ITEM NAMED SOURCE.Z_REL_CD |
| 3527 | SOURCE.NAME_TX | 3520 | 360 | 2 | A TEXT ITEM NAMED SOURCE.NAME_TX |
| 3528 | SOURCE.RG_SOURCE | 3520 | 377 | 2 | A RADIO GROUP NAMED SOURCE.RG_SOURCE |
| 3529 | SOURCE.PUSH_BUTTON439 | 3520 | 363 | 2 | A BUTTON NAMED SOURCE.PUSH_BUTTON439 |
| 3530 | PARTY_DRILL_DOWN | 3373 | 355 | 2 | A BLOCK NAMED PARTY_DRILL_DOWN |
| 3531 | GR_DRILL_DOWN | 3373 | 355 | 2 | A BLOCK NAMED GR_DRILL_DOWNN |

| | | | |
|---|---|---|---|
| 3532 | COB_REPRT | 3373 | 2 | A BLOCK NAMED COB_REPRT |
| 3533 | GR_FILTER | 3373 | 2 | A BLOCK NAMED GR_FILTER |
| 3534 | V_GEOGR_REG | 3373 | 2 | A BLOCK NAMED V_GEOGR_REG |
| 3535 | C_GEOGR_REG_FILTER | 3369 | 2 | A CANVAS NAMED C_GEOGR_REG_FILTER |
| 3518 | V_GEN_PARTY_COB_INFO_ROLE_TRAN.LANG_NAME_TX | 3515 | 2 | A TEXT ITEM NAMED V_GEN_PARTY_COB_INFO_ROLE_TRAN.LANG_NAME_TX |
| 3506 | V_GEN_PARTY_COB_INFO_ROLE | 3373 | 2 | A BLOCK NAMED V_GEN_PARTY_COB_INFO_ROLE |
| 3507 | STAB2 | 3404 | 2 | A TAB_PAGE NAMED STAB2 |
| 3508 | V_GEN_PARTY_COB_INFO_ROLE.GEN_PARTY_COB_INFO_ID | 3506 | 2 | A TEXT ITEM NAMED V_GEN_PARTY_COB_INFO_ROLE.GEN_PARTY_COB_INFO_ID |
| 3509 | V_GEN_PARTY_COB_INFO_ROLE.VAR_NAME_TX | 3506 | 2 | A TEXT ITEM NAMED V_GEN_PARTY_COB_INFO_ROLE.VAR_NAME_TX |
| 3510 | V_GEN_PARTY_COB_INFO_ROLE.STORD_VALUE | 3506 | 2 | A TEXT ITEM NAMED V_GEN_PARTY_COB_INFO_ROLE.STORD_VALUE |
| 3511 | V_GEN_PARTY_COB_INFO_ROLE.LANG_NAME_TX | 3506 | 2 | A TEXT ITEM NAMED V_GEN_PARTY_COB_INFO_ROLE.LANG_NAME_TX |
| 3512 | V_GEN_PARTY_COB_INFO_ROLE.ACTIV_YN | 3506 | 2 | A CHECKBOX NAMED V_GEN_PARTY_COB_INFO_ROLE.ACTIV_YN |
| 3513 | V_GEN_PARTY_COB_INFO_ROLE.PB_LANG_CD | 3506 | 2 | A BUTTON NAMED V_GEN_PARTY_COB_INFO_ROLE.PB_LANG_CD |
| 3514 | V_GEN_PARTY_COB_INFO_ROLE.PB_VALUE | 3506 | 2 | A BUTTON NAMED V_GEN_PARTY_COD_INFO_ROLE.PB_VALUE |
| 3515 | V_GEN_PARTY_COB_INFO_ROLE_TRAN | 3373 | 2 | A BLOCK NAMED V_GEN_PARTY_COB_INFO_ROLE_TRAN |
| 3516 | V_GEN_PARTY_COB_INFO_ROLE_TRAN.GEN_PARTY_COB_INFO_ID | 3515 | 2 | A TEXT ITEM NAMED V_GEN_PARTY_INFO_ROLE_TRAN.GEN_PARTY_COB_INFO_ID |
| 3517 | V_GEN_PARTY_COB_INFO_ROLE_TRAN.STORD_VALUE | 3515 | 2 | A TEXT ITEM NAMED V_GEN_PARTY_COB_INFO_ROLE_TRAN.STORD_VALUE |
| 3505 | V_GEN_PARTY_COB_INFO_TRANS.ACTIV_YN | 3501 | 2 | A CHECKBOX NAMED V_GEN_PARTY_COB_INFO_TRANS.ACTIV_YN |
| 3494 | V_GEN_PARTY_COB_INFO_PARTY.VAR_NAME_TX | 3491 | 2 | A TEXT ITEM NAMED V_GEN_PARTY_COB_INFO_PARTY.VAR_NAME_TX |
| 3495 | V_GEN_PARTY_COB_INFO_PARTY+PARTY.STORD_VALUE | 3491 | 2 | A TEXT ITEM NAMED C_GEN_PARTY_COB_INFO_PARTY.STORED_VALUE |
| 3496 | V_GEN_PARTY_COB_INFO_PARTY.LANG_NAME_TX | 3491 | 2 | A TEXT ITEM NAMED V_GEN_PARTY_COB_INFO_PARTY.LANG_NAME_TX |
| 3497 | V_GEN_PARTY_COB_INFO_PARTY.ACTIV_YN | 3491 | 2 | A CHECKBOX NAMED V_GEN_PARTY_COB_INFO_PARTY.ACTIV_YN |
| 3498 | V_GEN_PARTY_COB_INFO_PARTY.PB_LANG_CD | 3491 | 2 | A BUTTON NAMED V_GEN_PARTY_COB_INFO_PARTY.PB_LANG_CD |
| 3499 | V_GEN_PARTY_COB_INFO_PARTY.PB_VALUE | 3491 | 2 | A BUTTON NAMED V_GEN_PARTY_COB_INFO_PARTY.PB_VALUE |
| 3500 | V_GEN_PARTY_COB_NFO_PARTY.PB_Z_PARTY_COB_NFO_CD | 3491 | | A BUTTON NAMED V_GEN_PARTY_COB_INFO_PARTY.PB_Z_PARTY_COB_NFO_CD |

FIG. 7E-2

| | | | |
|---|---|---|---|
| 3501 | V_GEN_PARTY_COB_INFO_TRANS | 3373 | 355 | 2 | A BLOCK NAMED V_GEN_PARTY_COB_INFO_TRANS |
| 3502 | V_GEN_PARTY_COB_INFO_TRANS.GEN_PARTY_COB_INFO_ID | 3501 | 360 | 2 | A TEXT ITEM NAMED V_GEN_PARTY_COB_INFO_TRANS.GEN_PARTY_COB_INFO_ID |
| 3503 | V_GEN_PARTY_COB_INFO_TRANS.STORD_VALUE | 3501 | 360 | 2 | A TEXT ITEM NAMED V_GEN_PARTY_COB_INFO_TRANS.STORD_VALUE |
| 3504 | V_GEN_PARTY_COB_INFO_TRANS.LANG_NAME_TX | 3501 | 360 | 2 | A TEXT ITEM NAMED V_GEN_PARTY_COB_INFO_TRANS.LANG_NAME_TX |
| 3493 | V_GEN_PARTY_COB_INFO_PARTY.GEN_PARTY_COB_INFO_ID | 3491 | 360 | 2 | AS TEXT ITEM NAMED V_GEN_PARTY_COB_INFO_PARTY.GEN_PARTY_COB_INFO_ID |
| 3573 | V_FUNCT.DESCR_TX | 3563 | 360 | 2 | A TEXT ITEM NAMED V_FUNCT.DESCR_TX |
| 3574 | BLOCK_TITLE | 3557 | 359 | 2 | A VISUAL ATTRIBUTE NAMED BLOCK_TITLE |
| 3575 | V_FUNCT.PB_DOMAIN_CD | 3563 | 363 | 2 | A BUTTON NAMED V_FUNCT.PB_DOMAIN_CD |
| 3576 | V_FUNCT_DTL | 3557 | 355 | 2 | A BLOCK NAMED V_FUNCT_DTL |
| 3577 | V_FUNCT_DTL.NAME_TX | 3576 | 360 | 2 | A TEXT ITEM NAMED V_FUNCT_DTL.NAME_TX |
| 3578 | V_FUNCT_DTL.DSP_DOMAIN_CD | 3576 | 360 | 2 | A TEXT ITEM NAMED V_FUNCT_DTL.DSP_DOMAIN_CD |
| 3579 | V_FUNCT_DTL.ORDER_NR | 3576 | 360 | 2 | A TEXT ITEM NAMED V_FUNCT_DTL.ORDER_NR |
| 3580 | V_FUNCT_DTL.REQD_YN | 3576 | 362 | 2 | A CHECKBOX NAMED V_FUNCT_DTL.REQD_YN |
| 3581 | V_FUNCT_DTL.MAY_RPEAT_YN | 3576 | 362 | 2 | A CHECKBOX NAMED V_FUNCT_DTL.MAY_RPEAT_YN |
| 3582 | V_FUNCT_DTL.DESCR_TX | 3576 | 360 | 2 | A TEXT ITEM NAMED V_FUNCT_DTL.DESCR_TX |
| 3583 | V_FUNCT_DTL.FUNCT_DTL_ID | 3576 | 360 | 2 | A TEXT ITEM NAMED V_FUNCT_DTL.FUNCT_DTL_ID |
| 3572 | V_FUNCT.ACTIV_YN | 3563 | 362 | 2 | A CHECKBOX NAMED V_FUNCT.ACTIV_YN |
| 3554 | PLAN_TABLE.ID | 3539 | 360 | 2 | A TEXT ITEM NAMED PLAN_TABLE.ID |
| 3555 | PLAN_TABLE.PARENT_ID | 3539 | 360 | 2 | A TEXT ITEM NAMED PLAN_TABLE.PARENT_ID |
| 3556 | PLAN_TABLE.POSITION | 3539 | 360 | 2 | A TEXT ITEM NAMED PLAN_TABLE.POSITION |
| 3557 | FUNCTION | | 354 | 2 | A FORM NAMED FUNCTION |
| 3558 | STUFF | 3557 | 355 | 2 | A BLOCK NAMED STUFF |
| 3559 | W_MAIN | 3557 | 356 | 2 | A WINDOW NAMED W_MAIN |
| 3560 | C_MAIN | 3559 | 357 | 2 | A CANVAS NAMED C_MAIN |
| 3561 | DATA_CURRENT | 3557 | 359 | 2 | A VISUAL ATTRIBUTE NAMED DATA_CURRENT |

FIG. 7E-3

| | | | | |
|---|---|---|---|---|
| 3562 | STUFF.NULL_ITEM | 3558 | 360 | 2 | A TEXT ITEM NAMED STUFF.NULL_ITEM |
| 3563 | V_FUNCT | 3557 | 355 | 2 | A BLOCK NAMED V_FUNCT |
| 3564 | CUSTOM | 3557 | 359 | 2 | A VISUAL ATTRIBUTE NAMED CUSTOM |
| 3565 | DATA_BLUE | 3557 | 359 | 2 | A VISUAL ATTRIBUTE NAMED DATA_BLUE |
| 3566 | V_FUNCT.FUNCT_ID | 3563 | 359 | 2 | A TEXT ITEM NAMED V_FUNCT.FUNCT_ID |
| 3567 | DATA_ENTER | 3557 | 360 | 2 | A VISUAL ATTRIBUTE NAMED DATA_ENTER |
| 3568 | V_FUNCT.NAME_TX | 3563 | 360 | 2 | A TEXT ITEM NAMED V_FUNCT.NAME_TX |
| 3569 | V_FUNCT.DSP_Z_FUNCT_CD | 3563 | 360 | 2 | A TEXT ITEM NAMED V_FUNCT.DSP_Z_FUNCT_CD |
| 3570 | V-FUNCT.DSP_DOMAIN_CD | 3563 | 360 | 2 | A TEXT ITEM NAMED V_FUNCT.DSP_DOMAIN_CD |
| 3571 | DATA_DISPLAY | 3557 | 359 | 2 | A VISUAL ATTRIBUTE NAMED DATA_DISPLAY |
| 3553 | PLAN_TABLE.SEARCH_COLUMNS | 3539 | 360 | 2 | A TEXT ITEM NAMED PLAN_TABLE.SEARCH_COLUMNS |
| 3537 | V_GEOGR_REG.DSP_Z_GEOGR_REG_CD | 3534 | 360 | 2 | A TEXT ITEM NAMED V_GEOGR_REG.DSP_Z_GEOGR_REG_CD |
| 3538 | TEST_HELP | | 354 | 2 | A FORM NAMED TEST_HELP |
| 3539 | PLAN_TABLE | 3538 | 355 | 2 | A BLOCK NAMED PLAN_TABLE |
| 3540 | WINDOW1 | 3538 | 356 | 2 | A WINDOW NAMED WINDOW1 |
| 3541 | CANVAS2 | 3540 | 357 | 2 | A CANVAS NAMED CANVAS2 |
| 3542 | PLAN_TABLE.STATEMENT_ID | 3539 | 360 | 2 | A TEXT ITEM NAMED PLAN_TABLE.STATEMENT_ID |
| 3543 | PLAN_TABLE.TIMESTAMP | 3539 | 360 | 2 | A TEXT ITEM NAMED PLAN_TABLE.TIMESTAMP |
| 3544 | PLAN_TABLE.REMARKS | 3539 | 360 | 2 | A TEXT ITEM NAMED PLAN_TABLE.REMARKS |
| 3545 | PLAN_TABLE.OPERATION | 3539 | 360 | 2 | A TEXT ITEM NAMED PLAN_TABLE.OPERATION |
| 3546 | PLAN_TABLE.OPTIONS | 3539 | 360 | 2 | A TEXT ITEM NAMED PLAN_TABLE.OPTIONS |
| 3547 | PLAN_TABLE.OBJECT_NODE | 3539 | 360 | 2 | A TEXT ITEM NAMED PLAN_TABLE.OBJECT_NODE |
| 3548 | PLAN_TABLE.OBJECT_OWNER | 3539 | 360 | 2 | A TEXT ITEM NAMED PLAN_TABLE.OBJECT_OWNER |
| 3549 | PLAN_TABLE.OBJECT_NAME | 3539 | 360 | 2 | A TEXT ITEM NAMED PLAN_TABLE.OBJECT_NAME |
| 3550 | PLAN_TABLE.OBJECT_INSTANCE | 3539 | 360 | 2 | A TEXT ITEM NAMED PLAN_TABLE.OBJECT_INSTANCE |
| 3551 | PLAN_TABLE.OBJECT_TYPE | 3539 | 360 | 2 | A TEXT ITEM NAMED PLAN_TABLE.OBJECT_TYPE |
| 3552 | PLAN_TABLE.OPTIMIZER | 3539 | 360 | 2 | A TEXT ITEM NAMED PLAN_TABLE.OPTIMIZER |

FIG. 7E-4

| | | | | |
|---|---|---|---|---|
| 3536 | V_GEOGR_REG.ACTIV_YN | 3534 | 362 | 2 | A CHECKBOX NAMED V_GEOGR_REG.ACTIV_YN |
| 3480 | V_PARTY_ROLE_CHILD | 3373 | 355 | 2 | A BLOCK NAMED V_PARTY_ROLE_CHILD |
| 3481 | V_PARTY_ROLE_CHILD.PARTY_ROLE_ID | 3480 | 360 | 2 | A TEXT ITEM NAMED V_PARTY_ROLE_CHILD.PARTY_ROLE_ID |
| 3482 | V_PARTY_ROLE_CHILD.DSP_Z_REL_CD | 3480 | 360 | 2 | A TEXT ITEM NAMED V_PARTY_ROLE_CHILD.DSP_Z_REL_CD |
| 3483 | V_PARTY_ROLE_CHILD.DSP_Z_PARTY_CD | 3480 | 360 | 2 | A TEXT ITEM NAMED V_PARTY_ROLE_CHILD.DSP_Z_PARTY_CD |
| 3484 | V_PARTY_ROLE_CHILD.DSP_PARTY_ID | 3480 | 360 | 2 | A TEXT ITEM NAMED V_PARTY_ROLE_CHILD.DSP_PARTY_ID |
| 3485 | V_PARTY_ROLE_CHILD.START_DT | 3480 | 360 | 2 | A TEXT ITEM NAMED V_PARTY_ROLE_CHILD.START_DT |
| 3486 | V_PARTY_ROLE_CHILD.END_DT | 3480 | 360 | 2 | A TEXT ITEM NAMED V_PARTY_ROLE_CHILD.END_DT |
| 3487 | V_PARTY_ROLE_CHILD.ACTIV_YN | 3480 | 362 | 2 | A CHECKBOX NAMED V_PARTY_ROLE_CHILD.ACTIV_YN |
| 3488 | V_PARTY_ROLE_CHILD.PB_Z_REL_CD | 3480 | 363 | 2 | A BUTTON NAMED V_PARTY_ROLE_CHILD.PB_Z_REL_CD |
| 3489 | V_PARTY_ROLE_CHILD.PB_Z_PARTY_CD | 3480 | 363 | 2 | A BUTTON NAMED V_PARTY_ROLE_CHILD.PB_Z_PARTY_CD |
| 3490 | V_PARTY_ROLE_CHILD.PB_PARTY_ID | 3480 | 360 | 2 | A BUTTON NAMED V_PARTY_ROLE_CHILD.PB_PARTY_ID |
| 3491 | V_GEN_PARTY_COB_INFO_PARTY | 3373 | 355 | 2 | A BLOCK NAMED V_GEN_PARTY_COB_INFO_PARTY |
| 3492 | TAB3 | 3396 | 358 | 2 | A TAB PAGE NAMED TAB3 |
| 3479 | V_PARTY_ROLE_PARENT.PB_Z_PARTY_CD | 3469 | 363 | 2 | A BUTTON NAMED V_PARTY_ROLE_PARENT.PB_Z_PARTY_CD |
| 3465 | V_PARTY.ACTIV_YN | 3461 | 362 | 2 | A CHECKBOX NAMED V_PARTY.ACTIV_YN |
| 3466 | V_PARTY.END_DT | 3461 | 360 | 2 | A TEXT ITEM NAMED V_PARTY.END_DT |
| 3467 | V_PARTY.PERSN_YN | 3461 | 362 | 2 | A CHECKBOX NAMED V_PARTY.PERSN_YN |
| 3468 | V_PARTY.ORDER_NR | 3461 | 360 | 2 | A TEXT ITEM NAMED V_PARTY.ORDER_NR |
| 3469 | V_PARTY_ROLE_PARENT | 3373 | 355 | 2 | A BLOCK NAMED V_PARTY_ROLE_PARENT |
| 3470 | TAB2 | 3396 | 358 | 2 | A TAB PAGE NAMED TAB2 |
| 3471 | V_PARTY_ROLE_PARENT.PARTY_ROLE_ID | 3469 | 360 | 2 | A TEXT ITEM NAMED V_PARTY_ROLE_PARENT.PARTY_ROLE_ID |
| 3472 | V_PARTY_ROLE_PARENT.DSP_PARTY_ROLE_ID_RFK | 3469 | 360 | 2 | A TEXT ITEM NAMED V_PARTY_ROLE_PARENT.DSP_PARTY_ROLE_ID_RFK |
| 3473 | V_PARTY_ROLE_PARENT.DSP_Z_PARTY_CD | 3469 | 360 | 2 | A TEXT ITEM NAMED V_PARTY_ROLE_PARENT.DSP_Z_PARTY_CD |
| 3474 | V_PARTY_ROLE_PARENT.DSP_Z_REL_CD | 3469 | 360 | 2 | A TEXT ITEM NAMED V_PARTY_ROLE_PARENT.DSP_Z_REL_CD |
| 3475 | V_PARTY_ROLE_PARENT.ACTIV_YN | 3469 | 362 | 2 | A CHECKBOX NAMED V_PARTY_ROLE_PARENT.ACTIV_YN |
| 3476 | V_PARTY_ROLE_PARENT.START_DT | 3469 | 360 | 2 | A TEXT ITEM NAMED V_PARTY_ROLE_PARENT.START_DT |

| | | | |
|---|---|---|---|
| 3477 | V_PARTY_ROLE_PARENT.END_DT | 3469 | 2 | A TEXT ITEM NAMED V_PARTY_ROLE_PARENT.END_DT |
| 3478 | V_PARTY_ROLE_PARENT.PB_CNTXT_TX | 3469 | 360 | 2 | A BUTTON NAMED V_PARTY_ROLE_PARENT.PB_CNTXT_TX |
| 3464 | V_PARTY.START_DT | 3461 | 363 | 2 | A TEXT ITEM NAMED V_PARTY.START_DT |
| 3448 | LOCATOR.START_FROM_DT | 3433 | 360 | 2 | A TEXT ITEM NAMED LOCATOR.START_FROM_DT |
| 3449 | LOCATOR.START_TO_DT | 3433 | 360 | 2 | A TEXT ITEM NAMED LOCATOR.START_TO_DT |
| 3450 | LOCATOR.END_FROM_DT | 3433 | 360 | 2 | A TEXT ITEM NAMED LOCATOR.END_FROM_DT |
| 3451 | LOCATOR.END_TO_DT | 3433 | 360 | 2 | A TEXT ITEM NAMED LOCATOR.END_TO_DT |
| 3452 | LOCATOR.DSP_GEOGR_REG_ID | 3433 | 360 | 2 | A TEXT ITEM NAMED LOCATOR.DSP_GEOGR_REG_ID |
| 3453 | LOCATOR.DSP_Z_VAR_CD | 3433 | 360 | 2 | A TEXT ITEM NAMED LOCATOR.DSP_Z_VAR_CD |
| 3454 | LOCATOR.PB_Z_DOC_VAR_CD | 3433 | 363 | 2 | A BUTTON NAMED LOCATOR.PB_Z_DOC_VAR_CD |
| 3455 | LOCATOR.RAG.RAG_PERSN_ORG | 3433 | 377 | 2 | A RADIO GROUP NAMED LOCATOR.RAG_PERSN_ORG |
| 3456 | LOCATOR.RAG.ASPECT_TX | 3433 | 377 | 2 | A RADIO GROUP NAMED LOCATOR.RAG.ASPECT_TX |
| 3457 | LOCATOR.PB_Z_PARTY_CD | 3433 | 363 | 2 | A BUTTON NAMED LOCATOR.PB_Z_PARTY_CD |
| 3458 | LOCATOR.PB_CNTXT_TX | 3433 | 363 | 2 | A BUTTON NAMED LOCATOR.PB_CNTXT_TX |
| 3459 | LOCATOR.PB_Z_REL_CD | 3433 | 363 | 2 | A BUTTON NAMED LOCATOR.PB_Z_REL_CD |
| 3460 | LOCATOR.PB.GEOGR_REG_ID | 3433 | 363 | 2 | A BUTTON NAMED LOCATOR.PB_GEOGR_REL_ID |
| 3447 | LOCATOR.DSP_Z_REL_CD | 3433 | 360 | 2 | A TEXT ITEM NAMED LOCATOR.DSP_Z_REL_CD |
| 3461 | V_PARTY | 3373 | 355 | 2 | A BLOCK NAMED V_PARTY |
| 3462 | V_PARTY.PARTY_ID | 3461 | 360 | 2 | A TEXT ITEM NAMED V_PARTY.PARTY_ID |
| 3463 | V_PARTY.NAME_TX | 3461 | 360 | 2 | A TEXT ITEM NAMED V_PARTY.NAME_TX |
| 3431 | PARTY_FILTER_RESULT.NAME_TX | 3429 | 360 | 2 | A TEXT ITEM NAMED PARTY_FILTER_RESULT.NAME_TX |
| 3432 | PARTY_FILTER_RESULT.ACTIV_YN | 3429 | 362 | 2 | A CHECKBOX NAMED PARTY_FILTER_RESULT.ACTIV_YN |
| 3433 | LOCATOR | 3373 | 355 | 2 | A BLOCK NAMED LOCATOR |
| 3434 | LOCATOR.PARTY_ID | 3433 | 360 | 2 | A TEXT ITEM NAMED LOCATOR.PARTY_ID |
| 3435 | START_END_NR | 3395 | 357 | 2 | A CANVAS NAMED START_END_NR |
| 3436 | LOCATOR.FROM_NR | 3433 | 360 | 2 | A TEXT ITEM NAMED LOCATOR.FROM_NR |
| 3437 | START_END_DT | 3395 | 357 | 2 | A CANVAS NAMED START_END_DT |

| | | | | |
|---|---|---|---|---|
| 3438 | LOCATOR.FROM_DT | 3433 | 360 | 2 | A TEXT ITEM NAMED LOCATOR.FROM_DT |
| 3439 | LOCATOR.TO_NR | 3433 | 360 | 2 | A TEXT ITEM NAMED LOCATOR.TO_NR |
| 3440 | LOCATOR.TO_DT | 3433 | 360 | 2 | A TEXT ITEM NAMED LOCATOR.TO_DT |
| 3441 | LOCATOR.DSP_PARTY_ROLE_ID_RFK | 3433 | 360 | 2 | A TEXT ITEM NAMED LOCATOR.DSP_PARTY_ROLE_ID_RFK |
| 3430 | PARTY_FILTER_RESULT.PARTY_ID | 3429 | 360 | 2 | A TEXT ITEM NAMED PARTY_FILTER_RESULT.PARTY_ID |
| 3442 | LOCATOR.DSP_Z_PARTY_CD | 3433 | 360 | 2 | A TEXT ITEM NAMED LOCATOR.DSP_Z_PARTY_CD |
| 3443 | LOCATOR.VAR_VAL_TX | 3433 | 360 | 2 | A TEXT ITEM NAMED LOCATOR.VAR_VAL_TX |
| 3444 | LOCATOR.DSP_PARTY_ID | 3433 | 360 | 2 | A TEXT ITEM NAMED LOCATOR.DSP_PARTY_ID |
| 3445 | LOCATOR.FED_TAX_ID_ | 3433 | 360 | 2 | A TEXT ITEM NAMED LOCATOR.FED_TAX_ID_ |
| 3446 | LOCATOR.LEGCY_NR | 3433 | 360 | 2 | A TEXT ITEM NAMED LOCATOR.LEGCY_NR |
| 3414 | PARTY_ROLE.PARTY_ROLE_ID | 3413 | 360 | 2 | A TEXT ITEM NAMED PARTY_ROLE.PARTY_ROLE_ID |
| 3415 | PARTY_ROLE.CNTXT_TX | 3413 | 360 | 2 | A TEXT ITEM NAMED PARTY_ROLE.CNTXT_TX |
| 3416 | PARTY_ROLE.DSP_Z_REL_CD | 3413 | 360 | 2 | A TEXT ITEM NAMED PARTY_ROLE.DSP_Z_REL_CD |
| 3417 | PARTY_ROLE.DSP_Z_PARTY_CD | 3413 | 360 | 2 | A TEXT ITEM NAMED PARTY_ROLE.DSP_Z_PARTY_CD |
| 3418 | PARTY_ROLE.DSP_PARTY_ID | 3413 | 360 | 2 | A TEXT ITEM NAMED PARTY_ROLE.DSP_PARTY_ID |
| 3419 | PR_LOCATOR | 3373 | 355 | 2 | A BLOCK NAMED PR_LOCATOR |
| 3420 | DATA_ENTER | 3373 | 359 | 2 | A VISUAL ATRIBUTE NAMED DATA_ENTER |
| 3421 | PR_LOCATOR.NAME | 3419 | 360 | 2 | A TEXT ITEM NAMED PR_LOCATOR.NAME |
| 3422 | PR_LOCATOR.PARTY_ROLE_ID | 3419 | 360 | 2 | A TEXT ITEM NAMED PR_LOCATOR.PARTY_ROLE_ID |
| 3423 | PR_LOCATOR.DSP_Z_PARTY_CD | 3419 | 360 | 2 | A TEXT ITEM NAMED PR_LOCATOR.DSP_Z_PARTY_CD |
| 3424 | PARTY_FILTER | 3373 | 355 | 2 | A BLOCK NAMED PARTY_FILTER |
| 3425 | C_PARTY_FILTER | 3384 | 357 | 2 | A CANVAS NAMED C_PARTY_FILTER |
| 3426 | PARTY_FILTER.PARTY_ID | 3424 | 360 | 2 | A TEXT ITEM NAMED PARTY_FILTER.PARTY_ID |
| 3413 | PARTY_ROLE | 3373 | 355 | 2 | A BLOCK NAMED PARTY_ROLE |
| 3427 | PARTY_FILTER.DSP_PARTY_ID | 3424 | 360 | 2 | A TEXT ITEM NAMED PARTY_FILTER.DSP_PARTY_ID |
| 3428 | PARTY_FILTER.DSP_Z_PARTY_CD | 3424 | 360 | 2 | A TEXT ITEM NAMED PARTY_FILTER.DSP_Z_PARTY_CD |
| 3429 | PARTY_FILTER_RESULT | 3373 | 355 | 2 | A BLOCK NAMED PARTY_FILTER_RESULT |
| 3394 | STUFF.PB_START_OVER | 3374 | 363 | 2 | A BUTTON NAMED STUFF.PB_START_OVER |

FIG. 7E-7

| | | | | |
|---|---|---|---|---|
| 3395 | W_MAIN | 3373 | 356 | 2 | A WINDOW NAMED W_MAIN |
| 3396 | C_TAB | 3395 | 357 | 2 | A CANVAS NAMED C_TAB |
| 3397 | TAB4 | 3396 | 358 | 2 | A TAB PAGE NAMED TAB4 |
| 3398 | STUFF.PARTY_CNTXT | 3374 | 360 | 2 | A TEXT ITEM NAMED STUFF.PARTY_CNTXT |
| 3399 | STUFF.PB_PARTY_CNTXT | 3374 | 363 | 2 | A BUTTON NAMED STUFF.PB_PARTY_CNTXT |
| 3400 | TAB1 | 3396 | 358 | 2 | A TAB PAGE NAMED TAB1 |
| 3401 | DATA_DISPLAY | 3373 | 359 | 2 | A VISUAL ATTRIBUTE NAMED DATA_DISPLAY |
| 3402 | STUFF.INCLD_INACTIV | 3374 | 362 | 2 | A CHECKBOX NAMED STUFF.INCLD_INACTIV |
| 3403 | STUFF.RESULT | 3374 | 362 | 2 | A CHECKBOX NAMED STUFF.RESULT |
| 3404 | C_SUBTAB | 3395 | 357 | 2 | A CANVAS NAMED C_SUBTAB |
| 3405 | STAB1 | 3404 | 358 | 2 | A TAB PAGE NAMED STAB1 |
| 3406 | STUFF.SUBTAB_NULL_ITEM | 3374 | 360 | 2 | A TEXT ITEM NAMED STUFF.SUBTAB_NULL_ITEM |
| 3407 | STUFF.TAB_NULL_ITEM | 3374 | 360 | 2 | A TEXT ITEM NAMED STUFF.TAB_NULL_ITEM |
| 3393 | STUFF.PB_GR_QUIT | 3374 | 363 | 2 | A BUTTON NAMED STUFF.PB_GR_QUIT |
| 3408 | DATA_CURRENT | 3373 | 359 | 2 | A VISUAL ATTRIBUTE NAMED DATA_CURRENT |
| 3409 | STUFF.NULL_ITEM | 3374 | 360 | 2 | A TEXT ITEM NAMED STUFF.NULL_ITEM |
| 3410 | C_MAIN | 3395 | 357 | 2 | A CANVAS NAMED C_MAIN |
| 3411 | DATA_BLUE | 3373 | 359 | 2 | A VISUAL ATTRIBUTE NAMED DATA_BLUE |
| 3412 | STUFF.HEADR_TX | 3374 | 361 | 2 | A DISPLAY ITEM NAMED STUFF.HEADR_TX |
| 3374 | STUFF | 3373 | 355 | 2 | A BLOCK NAMED STUFF |
| 3373 | PARTY_111 | | 354 | 2 | A FORM NAMED PARTY_111 |
| 3375 | W_PICK | 3373 | 356 | 2 | A WINDOW NAMED W_PICK |
| 3376 | C_PICK | 3375 | 357 | 2 | A CANVAS NAMED C_PICK |
| 3377 | CUSTOM | 3373 | 359 | 2 | A VISUAL ATTRIBUTE NAMED CUSTOM |
| 3378 | BLOCK_TITLE | 3373 | 359 | 2 | A VISUAL ATTRIBUTE NAMED BLOCK_TITLE |
| 3379 | STUFF.PB_BACK | 3374 | 363 | 2 | A BUTTON NAMED STUFF.PB_BACK |
| 3380 | C_TB_PICK | 3375 | 357 | 2 | A CANVAS NAMED C_TB_PICK |

FIG. 7E-8

| | | | | |
|---|---|---|---|---|
| 3381 | STUFF.PB_PR_FILTER | 3374 | 363 | 2 | A BUTTON NAMED STUFF.PB.PB_PR_FILTER |
| 3382 | STUFF.PB_PR_QUIT | 3374 | 363 | 2 | A BUTTON NAMED STUFF.PB.PB_PR_QUIT |
| 3383 | STUFF.PB_PR_PICK | 3374 | 363 | 2 | A BUTTON NAMED STUFF.PB.PB_PR_PICK |
| 3384 | W_PARTY_FILTER | 3373 | 356 | 2 | A WINDOW NAMED W_PARTY_FILTER |
| 3385 | C_TB_PARTY_FILTER | 3384 | 357 | 2 | A CANVAS NAMED C_TB_PARTY_FILTER |
| 3386 | STUFF.PB_PARTY_FILTER | 3374 | 363 | 2 | A BUTTON NAMED STUFF.PB.PB_PARTY_FILTER |
| 3387 | STUFF.PB_PARTY_QUIT | 3374 | 363 | 2 | A BUTTON NAMED STUFF.PB.PB_PARTY_QUIT |
| 3388 | STUFF.PB_PARTY_PICK | 3374 | 363 | 2 | A BUTTON NAMED STUFF.PB.PB_PARTY_PICK |
| 3389 | W_GEOGR_REG_FILTER | 3373 | 356 | 2 | A WINDOW NAMED W_GEOGR_REG_FILTER |
| 3390 | C_TB_GEOGR_REG | 3389 | 357 | 2 | A CANVAS NAMED C_TB_GEOGR_REG |
| 3391 | STUFF.PB_GR_PICK | 3374 | 363 | 2 | A BUTTON NAMED STUFF.PB.PB_GR_PICK |
| 3392 | STUFF.PB_GR_FILTER | 3374 | 363 | 2 | A BUTTON NAMED STUFF.PB.PB_GR_FILTER |

FIG. 7E-9

ABSTR_OBJ

| ABSTR_OBJ_ID | SYSTEM_ID_FK | DEF_OBJ_ID_FK | NAME_TX | DESCR_TX |
|---|---|---|---|---|
| 1 | 2 | 354 | | |
| 2 | 2 | 355 | | |
| 3 | 2 | 355 | | |

FIG. 7F

LANG

| LANG_CD | NAME_TX | DESCR_TX |
|---|---|---|
| ENGLISH | ENGLISH | |
| FRENCH | FRENCH | |
| GERMAN | GERMAN | |

FIG. 7G

LABEL_SET

| LABEL_SET_CD | NAME_TX | LANG_CD_FK | SYSTEM_ID_FK | DESCR_TX |
|---|---|---|---|---|
| ABC_ENG | ABC CORP. - ENGLISH | ENGLISH | 1 | THE PAYROLL SYSTEM WITH ENGLISH LABELS. |
| ABC_FR | ABC CORP. - FRENCH | FRENCH | 1 | THE PAYROLL SYSTEM WITH FRENCH LABELS. |
| ABC_GRM | ABC CORP. - GERMAN | GERMAN | 1 | THE PAYROLL SYSTEM WITH GERMAN LABELS. |

FIG. 7H

DOMAIN

| DOMAIN_CD | NAME_TX | DEFLT_TX | DEFLT_NR | DEFLT_DT | DATA_TYPE_CD | LNGTH_NR | MAX_NR | MIN_NR | PRCSN_NR | VALID_RULE_TX | DESCR_TX | Z_DOMAIN_CD |
|---|---|---|---|---|---|---|---|---|---|---|---|---|
| 1 | MONEY | MONEY | | | NUMBER | 10 | | | 2 | | | |
| 2 | SMALL AMOUNT | | | | NUMBER | 6 | | | | | | |

FIG. 7I

DEF_OBJ_ATTR

| DEF_OBJ_ATTR_ID | NAME | DEF_OBJ_ID_FK | ABST_OBJ_IDF_YN | DOMAIN_CD_FK | DESCR_TX |
|---|---|---|---|---|---|
| 431 | VISUAL ATTRIBUTE | 357 | Y | CHAR | VISUAL ATTRIBUTE FOR A CANVAS. |
| 432 | LABEL | 358 | Y | CHAR | LABEL FOR A TAB PAGE. |
| 433 | PROMPT TEXT | 360 | Y | CHAR | PROMPT TEXT FOR A TEXT ITEM. |
| 434 | LABEL | 362 | Y | CHAR | LABEL FOR A CHECKBOX. |
| 435 | LABEL | 363 | Y | CHAR | LABEL FOR A BUTTON. |
| 430 | TITLE | 356 | Y | CHAR | TITLE FOR A WINDOW. |
| 436 | HINT TEXT | 360 | Y | CHAR | HINT TEXT FOR A TEXT ITEM. |
| 437 | TOOLTIP TEXT | 360 | Y | CHAR | TOOLTIP TEXT FOR A TEXT ITEM. |
| 438 | HINT TEXT | 361 | Y | CHAR | HINT TEXT FOR A DISPLAY ITEM. |
| 439 | TOOLTIP TEXT | 361 | Y | CHAR | TOOLTIP TEXT FOR A DISPLAY ITEM. |
| 440 | HINT TEXT | 362 | Y | CHAR | HINT TEXT FOR A CHECKBOX. |
| 441 | TOOLTIP TEXT | 362 | Y | CHAR | TOOLTIP TEXT FOR A CHECKBOX. |
| 442 | HINT TEXT | 363 | Y | CHAR | HINT TEXT FOR A BUTTON. |
| 443 | TOOLTIP TEXT | 363 | Y | CHAR | TOOLTIP TEXT FOR A BUTTON. |

| 7K-1 |
| 7K-2 |
| 7K-3 |
| 7K-4 |
| 7K-5 |
| 7K-6 |
| 7K-7 |

OBJ_VALUE

| OBJ_VALUE_ID | VALUE_TX | VALUE_NR | DEF_OBJ_ID_FK | OBJ_ID_FK | LABEL_SET_CD_FK | DEF_OBJ_ATTR_ID_FK | ABSTR_OBJ_ID_FK |
|---|---|---|---|---|---|---|---|
| 2284 | DEFAULT | | 357 | 3376 | ABC_ENG | 431 | |
| 2285 | BACK | | 363 | 3379 | ABC_ENG | 442 | |
| 2286 | BACK | | 363 | 3379 | ABC_ENG | 435 | |
| 2287 | DEFAULT | | 357 | 3380 | ABC_ENG | 431 | |
| 2288 | FILTER | | 363 | 3381 | ABC_ENG | 442 | |
| 2283 | W_PICK | | 356 | 3375 | ABC_ENG | 430 | |
| 2289 | FILTER | | 363 | 3381 | ABC_ENG | 443 | |
| 2290 | QUIT | | 363 | 3382 | ABC_ENG | 442 | |
| 2291 | QUIT | | 363 | 3382 | ABC_ENG | 443 | |
| 2292 | PICK CONTEXT | | 363 | 3383 | ABC_ENG | 442 | |
| 2293 | PICK CONTEXT | | 363 | 3383 | ABC_ENG | 443 | |

FIG. 7K-1

| | | | | |
|---|---|---|---|---|
| 2294 | W_PARTY_FILTER | 356 | 3384 | ABC_ENG | 430 |
| 2296 | FILTER | 363 | 3386 | ABC_ENG | 442 |
| 2297 | FILTER | 363 | 3386 | ABC_ENG | 443 |
| 2298 | QUIT | 363 | 3387 | ABC_ENG | 442 |
| 2300 | PICK CONTEXT | 363 | 3388 | ABC_ENG | 442 |
| 2301 | PICK CONTEXT | 363 | 3388 | ABC_ENG | 443 |
| 2302 | W_GEOGR_REG FILTER | 356 | 3389 | ABC_ENG | 430 |
| 2304 | PICK CONTEXT | 363 | 3391 | ABC_ENG | 442 |
| 2305 | PICK CONTEXT | 363 | 3391 | ABC_ENG | 443 |
| 2306 | FILTER | 363 | 3392 | ABC_ENG | 442 |
| 2308 | QUIT | 363 | 3393 | ABC_ENG | 442 |
| 2309 | QUIT | 363 | 3393 | ABC_ENG | 443 |
| 2311 | QUIT | 363 | 3394 | ABC_ENG | 443 |
| 2312 | PARTY MAINTENANCE | 356 | 3395 | ABC_ENG | 430 |
| 2401 | U | 363 | 3513 | ABC_ENG | 435 |
| 2404 | VALUE | 360 | 3517 | ABC_ENG | 433 |
| 2408 | ID | 360 | 3523 | ABC_ENG | 433 |
| 2416 | WINDOW1 | 356 | 3540 | ABC_ENG | 430 |
| 2417 | DEFAULT | 357 | 3541 | ABC_ENG | 431 |
| 2418 | STATEMENT ID | 360 | 3542 | ABC_ENG | 433 |
| 2419 | TIMESTAMP | 360 | 3543 | ABC_ENG | 433 |
| 2420 | REMARKS | 360 | 3544 | ABC_ENG | 433 |
| 2421 | OPERATION | 360 | 3545 | ABC_ENG | 433 |
| 2422 | OPTIONS | 360 | 3546 | ABC_ENG | 433 |
| 2423 | OBJECT NODE | 360 | 3547 | ABC_ENG | 433 |
| 2424 | OBJECT OWNER | | 3548 | ABC_ENG | 433 |

FIG. 7K-2

| 2425 | OBJECT NAME | 360 | 3549 | ABC_ENG | 433 | |
|---|---|---|---|---|---|---|
| 2426 | OBJECT INSTANCE | 360 | 3550 | ABC_ENG | 433 | |
| 2427 | OBJECT TYPE | 360 | 3551 | ABC_ENG | 433 | |
| 2428 | OPTIMIZER | 360 | 3552 | ABC_ENG | 433 | |
| 2429 | SEARCH COLUMNS | 360 | 3553 | ABC_ENG | 433 | |
| 2430 | ID | 360 | 3554 | ABC_ENG | 433 | |
| 2431 | PARENT ID | 360 | 3555 | ABC_ENG | 433 | |
| 2432 | POSITION | 360 | 3556 | ABC_ENG | 433 | |
| 2433 | FUNCTION MAINTENANCE | 356 | 3559 | ABC_ENG | 430 | |
| 2434 | CUSTOM | 357 | 3560 | ABC_ENG | 431 | |
| 2396 | PARTY ROLE INFO | 358 | 3507 | ABC_ENG | 432 | |
| 2411 | ASSOCIATION | 360 | 3526 | ABC_ENG | 433 | |
| 2412 | NAME | 360 | 3527 | ABC_ENG | 433 | |
| 2413 | QUIT | 363 | 3529 | ABC_ENG | 435 | |
| 2414 | DEFAULT | 357 | 3535 | ABC_ENG | 431 | |
| 2415 | TYPE | 360 | 3537 | ABC_ENG | 433 | |
| 2295 | DEFAULT | 357 | 3385 | ABC_ENG | 431 | |
| 2299 | QUIT | 363 | 3387 | ABC_ENG | 433 | |
| 2303 | DEFAULT | 357 | 3390 | ABC_ENG | 431 | |
| 2307 | FILTER | 363 | 3392 | ABC_ENG | 443 | |
| 2310 | START OVER | 363 | 3394 | ABC_ENG | 442 | |
| 2326 | TYPE | 360 | 3417 | ABC_ENG | 433 | |
| 2330 | TYPE | 360 | 3423 | ABC_ENG | 433 | |
| 2334 | ROLE | 360 | 3428 | ABC_ENG | 433 | |
| 2337 | ID | 360 | 3434 | ABC_ENG | 433 | |
| 2341 | FROM | 360 | 3438 | ABC_ENG | 433 | |

FIG. 7K-3

| 2344 | CONTEXT | | 3441 | ABC_ENG | 433 | | |
|---|---|---|---|---|---|---|---|
| 2360 | U | 363 | 3459 | ABC_ENG | 435 | | |
| 2363 | NAME | 360 | 3463 | ABC_ENG | 433 | | |
| 2367 | PARTY ROLE | 358 | 3470 | ABC_ENG | 432 | | |
| 2371 | RELATION | 360 | 3474 | ABC_ENG | 433 | | |
| 2375 | U | 363 | 3479 | ABC_ENG | 435 | | |
| 2389 | LANG | 360 | 3496 | ABC_ENG | 433 | | |
| 2393 | ID | 360 | 3502 | ABC_ENG | 433 | | |
| 2410 | ROLE | 360 | 3525 | ABC_ENG | 433 | | |
| 2378 | TYPE | 360 | 3483 | ABC_ENG | 433 | | |
| 2379 | SOURCE | 360 | 3484 | ABC_ENG | 433 | | |
| 2380 | START DT | 360 | 3485 | ABC_ENG | 433 | | |
| 2381 | END DT | 360 | 3486 | ABC_ENG | 433 | | |
| 2382 | U | 363 | 3488 | ABC_ENG | 435 | | |
| 2383 | U | 363 | 3489 | ABC_ENG | 435 | | |
| 2384 | U | 363 | 3490 | ABC_ENG | 435 | | |
| 2385 | PARTY INFO | 358 | 3492 | ABC_ENG | 432 | | |
| 2386 | ID | 360 | 3493 | ABC_ENG | 433 | | |
| 2387 | VAR | 360 | 3494 | ABC_ENG | 433 | | |
| 2388 | VALUE | 360 | 3495 | ABC_ENG | 433 | | |
| 2390 | U | 363 | 3498 | ABC_ENG | 435 | | |
| 2391 | U | 363 | 3499 | ABC_ENG | 435 | | |
| 2392 | U | 363 | 3500 | ABC_ENG | 435 | | |
| 2394 | VALUE | 360 | 3503 | ABC_ENG | 433 | | |
| 2395 | LANG | 360 | 3504 | ABC_ENG | 433 | | |
| 2397 | ID | 360 | 3508 | ABC_ENG | 433 | | |
| 2398 | VAR | 360 | 3509 | ABC_ENG | 433 | | |

FIG. 7K-4

| | | | | |
|---|---|---|---|---|
| 2399 | VALUE | 360 | 3510 | ABC_ENG | 433 |
| 2400 | LANG | 360 | 3511 | ABC_ENG | 433 |
| 2402 | U | 363 | 3514 | ABC_ENG | 435 |
| 2403 | ID | 360 | 3516 | ABC_ENG | 433 |
| 2405 | LANG | 360 | 3518 | ABC_ENG | 433 |
| 2406 | W_SOURCE | 356 | 3521 | ABC_ENG | 430 |
| 2407 | CUSTOM | 357 | 3522 | ABC_ENG | 431 |
| 2377 | RELATION | 360 | 3482 | ABC_ENG | 433 |
| 2409 | CONTEXT | 360 | 3524 | ABC_ENG | 433 |
| 2346 | TX | 360 | 3443 | ABC_ENG | 433 |
| 2347 | NAME | 360 | 3444 | ABC_ENG | 433 |
| 2348 | EIN | 360 | 3445 | ABC_ENG | 433 |
| 2349 | LEGCY | 360 | 3446 | ABC_ENG | 433 |
| 2350 | REL TYPE | 360 | 3447 | ABC_ENG | 433 |
| 2351 | START FROM | 360 | 3448 | ABC_ENG | 433 |
| 2352 | TO | 360 | 3449 | ABC_ENG | 433 |
| 2353 | END FROM | 360 | 3450 | ABC_ENG | 433 |
| 2354 | TO | 360 | 3451 | ABC_ENG | 433 |
| 2355 | NAME | 360 | 3452 | ABC_ENG | 433 |
| 2356 | NAME | 360 | 3453 | ABC_ENG | 433 |
| 2357 | U | 363 | 3454 | ABC_ENG | 435 |
| 2358 | U | 363 | 3457 | ABC_ENG | 435 |
| 2359 | U | 363 | 3458 | ABC_ENG | 435 |
| 2361 | U | 363 | 3460 | ABC_ENG | 435 |
| 2362 | ID | 360 | 3462 | ABC_ENG | 433 |
| 2364 | START DT | 360 | 3464 | ABC_ENG | 433 |
| 2365 | END DT | 360 | 3466 | ABC_ENG | 433 |

FIG. 7K-5

| | | | | |
|---|---|---|---|---|
| 2366 | ORD NUM | | | |
| 2368 | ID | 360 | 3468 | ABC_ENG | 433 |
| 2369 | CONTEXT | 360 | 3471 | ABC_ENG | 433 |
| 2370 | TYPE | 360 | 3472 | ABC_ENG | 433 |
| 2372 | START DT | 360 | 3473 | ABC_ENG | 433 |
| 2373 | END DT | 360 | 3476 | ABC_ENG | 433 |
| 2374 | U | 363 | 3477 | ABC_ENG | 433 |
| 2345 | TYPE | 360 | 3478 | ABC_ENG | 435 |
| 2376 | ID | 360 | 3442 | ABC_ENG | 433 |
| 2436 | NAME | 360 | 3481 | ABC_ENG | 433 |
| 2437 | TYPE | 360 | 3568 | ABC_ENG | 433 |
| 2438 | DOMAIN | 360 | 3569 | ABC_ENG | 433 |
| 2439 | DESCR | 360 | 3570 | ABC_ENG | 433 |
| 2440 | U | 363 | 3573 | ABC_ENG | 435 |
| 2441 | NAME | 360 | 3575 | ABC_ENG | 433 |
| 2442 | DOMAIN | 360 | 3577 | ABC_ENG | 433 |
| 2443 | ORDER | 360 | 3578 | ABC_ENG | 433 |
| 2444 | DESCR | 360 | 3579 | ABC_ENG | 433 |
| 2445 | ID | 360 | 3582 | ABC_ENG | 433 |
| 2435 | IDD | 360 | 3583 | ABC_ENG | 433 |
| 2314 | CHILD ROLE | 358 | 3566 | ABC_ENG | 432 |
| 2315 | CNTXT | 360 | 3397 | ABC_ENG | 433 |
| 2316 | U | 363 | 3398 | ABC_ENG | 435 |
| 2317 | LOCATOR | 358 | 3399 | ABC_ENG | 432 |
| 2318 | CHECK_BOX159 | 362 | 3400 | ABC_ENG | 434 |
| 2319 | CHECK_BOX159 | 362 | 3402 | ABC_ENG | 434 |
| 2320 | CUSTOM | 357 | 3403 | ABC_ENG | 431 |

FIG. 7K-6

| | | | | |
|---|---|---|---|---|
| 2321 | SUB ROLE | | | |
| 2322 | CUSTOM | 358 | 3405 | ABC_ENG | 432 |
| 2323 | ID | 357 | 3410 | ABC_ENG | 431 |
| 2324 | CONTEXT | 360 | 3414 | ABC_ENG | 433 |
| 2325 | RELATION | 360 | 3415 | ABC_ENG | 433 |
| 2327 | SOURCE | 360 | 3416 | ABC_ENG | 433 |
| 2328 | NAME | 360 | 3418 | ABC_ENG | 433 |
| 2329 | ID | 360 | 3421 | ABC_ENG | 433 |
| 2331 | DEFAULT | 357 | 3422 | ABC_ENG | 431 |
| 2332 | ID | 360 | 3425 | ABC_ENG | 433 |
| 2333 | NAME | 360 | 3426 | ABC_ENG | 433 |
| 2335 | ID | 360 | 3427 | ABC_ENG | 433 |
| 2336 | NAME | 360 | 3430 | ABC_ENG | 433 |
| 2313 | CUSTOM | 357 | 3431 | ABC_ENG | 431 |
| 2338 | DEFAULT | 357 | 3396 | ABC_ENG | 431 |
| 2339 | FROM | 360 | 3435 | ABC_ENG | 433 |
| 2340 | DEFAULT | 357 | 3436 | ABC_ENG | 431 |
| 2342 | TO | 360 | 3437 | ABC_ENG | 433 |
| 2343 | TO | 360 | 3439 | ABC_ENG | 433 |
| | | 360 | 3440 | ABC_ENG | 433 |

FIG. 7K-7

METHOD AND COMPUTER SYSTEM FOR CUSTOMIZING COMPUTER APPLICATIONS BY STORING THE CUSTOMIZATION SPECIFICATION AS DATA IN A DATABASE

The present application claims priority from a provisional application entitled "Method and Computer System for Customizing Computer Applications by Storing the Customization Specifications as Data in a Database," Ser. No. 60/225,075, filed on Aug. 14, 2000 and now pending.

FIELD OF THE INVENTION

The present invention relates to a method and computer system to customize computer software, including multilingual labels, error messages, context-sensitive help, security, and client preferences, such as display preferences, by storing the customization specifications as data in a database.

BACKGROUND OF THE INVENTION

Typically, when users want a software application customized to meet their needs, it is necessary for application developers to use a programming language or software development environment to modify existing code. However, it is expensive in terms of both time and money for application developers to customize software. Consequently, it is advantageous if users could customize the applications themselves.

In particular, if an application is needed to be deployed in two or more languages, traditional software developers would write multiple versions of the same screen, causing the number of screens in the system to be increase by a factor of two or more. In a traditional system, a different set of screens would be required to support each additional language. It is expensive to support multilingual requirements in this manner.

Error messages are another area that users would like to customize. Frequently, error messages are written in a technical way that an applications developer can understand, but not necessarily a user. There is a strong need in the industry to be able to provide users a tool that they themselves (or documentation writers) can use to write meaningful, user-friendly error messages.

Context-sensitive help is becoming a standard in the computer industry. End user applications are becoming increasingly documented with help screens. However, the effectiveness of help still could be greatly improved by giving users or documentation writers the power to write their own error messages.

The ability to support a sophisticated access control and security mechanism is another important aspect that can be thought of as customizing software. Different users who have different roles will have varying security requirements.

Finally, unique and different client preferences are another aspect that contribute to increasingly complex systems administration. Frequently, in computer systems the preferences are supported by generating multiple versions of the applications, each of which needs to be compiled and deployed appropriately throughout the organization. This creates an overall computing environment that is very unstable and difficult to support. In addition, users may not be able to express their display preferences until the testing phase, or even later such as when the entire system is in production. Consequently, there is a need for users to be able to customize their own desktops, including setting their own display preferences.

Today's programming languages and system development environments are complex, and mastered only by programmers, not by end users. Providing an environment or system in which users can specify their own customizations greatly increases the control that users have over their system, and users can then maintain their own customization information.

Given the above problems, the present invention provides novel methods and computer systems which give a user the capability to flexibly alter the run-time version of a program they are operating, while avoiding the shortcomings and drawbacks of prior methodologies.

SUMMARY OF THE INVENTION

The present invention enables users to specify a value for an attribute for any object that can be modified at run-time. The approach of only employing run-time modifications allows for only one application to be built and it can be used to support any number of different sets of users.

The system according to the present invention allows users to store the structure of their programs. It provides a repository to store the structure of programs.

The invention, in a further aspect, allows users to customize their software application to multiple languages.

In yet another aspect, the present invention provides a method and system to allow a user to customize their error messages.

The present invention further provides such systems that allow users to customize their own help messages, including context-sensitive help messages.

The present invention provides methods and systems to allows users to specify their own security requirements.

In another important aspect, this invention provides the capability for users to set their own display preferences.

Because the present invention models both the data and the data structure, a wide variety of functions, companies, and industries (such as, e.g., a retailer or tax organization) can implement the same system.

BRIEF DESCRIPTION OF THE DRAWINGS

For a more complete understanding of the invention, the following Detailed Description should be read in conjunction with the accompanying Drawings, wherein:

FIGS. 1B–1C are physical schematic representations of various Entities, the various respective information fields thereof, the type of information contained therein, and the relationships contained therein;

FIGS. 1D–1E are examples of sample data in various Entities and Tables shown in FIGS. 1B–1C;

FIG. 2 is an overview of an embodiment of the present invention;

FIGS. 4-A to 4-K are physical schematic representations of various Entities, the various respective information fields thereof, the type of information contained therein, and the relationships contained therein;

FIGS. 7-A to 7-K are examples of a computer application which is used as the basis for the sample data populate tables.

DETAILED DESCRIPTION OF THE INVENTION

The present invention is described with reference to one specific type of graphical data modeling, entity-relationship (ER) diagrams. However, those of ordinary skill in that art will recognize that the scope of the present invention is not limited to this particular embodiment.

This section first briefly describes how to interpret the ER diagrams, and their associated tables, as they are used in various Figures throughout this document. Entity-Relationship Diagrams are well-known in the art and have a specific, precise meaning to database designers and developers, and consist of two major parts: entities and relationships.

Figure 1A:
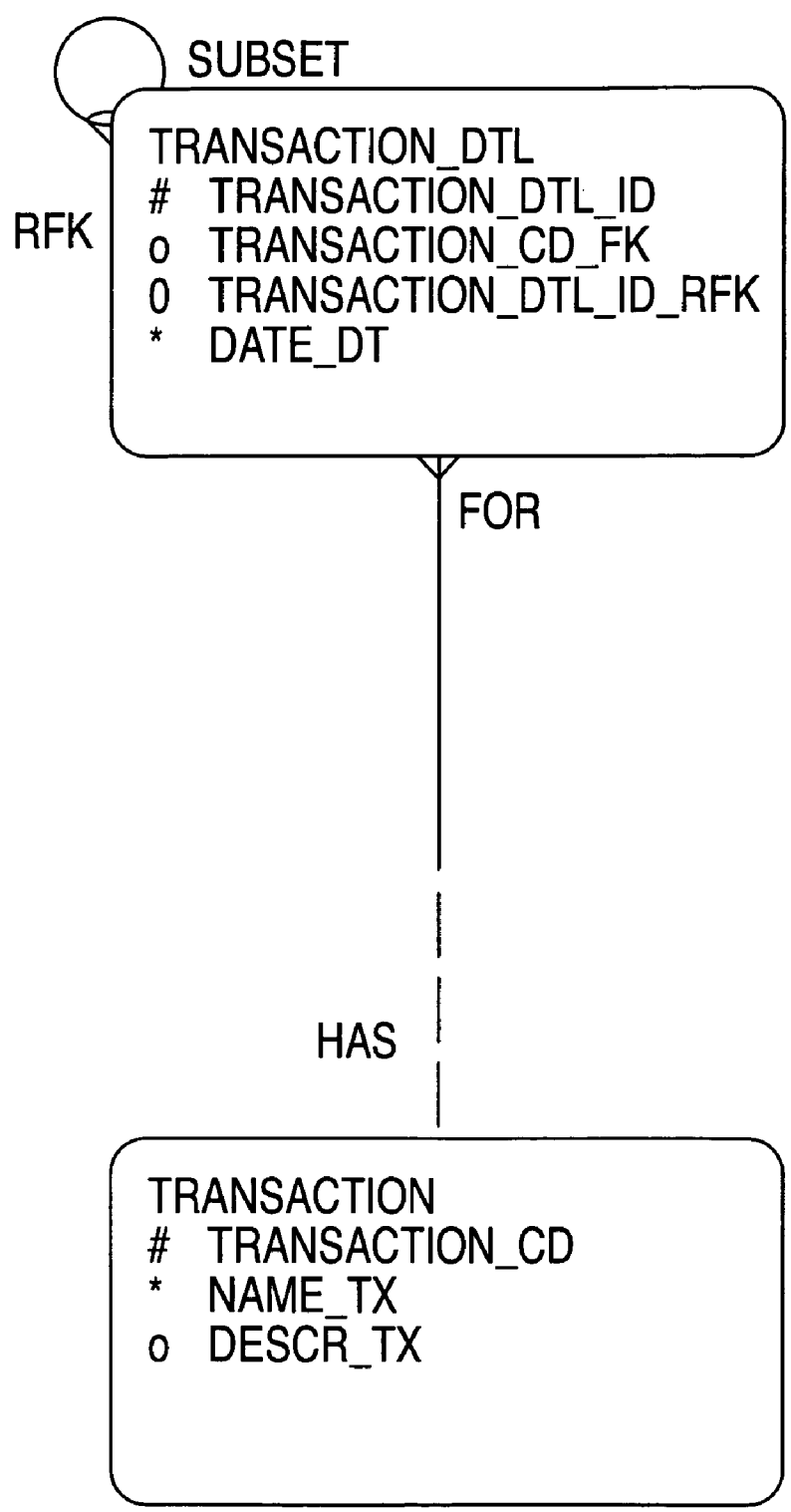
FIG. 1A is a schematic representation (logical, entity-relationship diagram) of a simple Transaction and Transaction Detail example.

FIG. 1A is an example of a simplistic Entity-Relationship Diagram.

An entity is a thing of interest. The rectangular box represents an entity, and the text string in the first line of the box is the name of the entity. The text string in the second line of the box, having a pound sign ("#"), is the primary key. The primary key is the unique identifier of data in the table. In the case of the ER diagram of FIG. 1A the name of the entity is "Transaction," and "Transaction_CD" is the primary key. The text strings in the following lines represent attributes. There are two types of attributes, namely "not null" attributes (i.e., mandatory attributes) which must have information entered when a user enters information, (indicated with an asterisk ("*")); and nullable attributes (i.e., optional attributes) which do not need to have information entered (indicated with the letter "o"). In "Transaction," the attribute "Name_TX" is a mandatory attribute, while the attribute "Descr_TX" is optional.

| Symbol | Meaning |
|---|---|
| # | Primary Key |
| * | Not Null Field (i.e., mandatory) |
| o | Nullable Field (i.e., optional) |

Relationships are represented in the Figures by lines between entities. There are a few types of relationships. The specific line in the example in FIG. 1A represents a one-to-many relationship. In a one-to-many relationship, the primary key of Transaction (i.e., Transaction_CD) becomes the foreign key of the many, Transaction_Dtl. The name of the foreign key is denoted by the name of the primary key with an "FK" suffix added, i.e., Transaction_CD_FK. In this example, it is interpreted as Transactions have one or more Transaction details associated with them. The Transaction has Transaction Details associated with it; and Transaction Details are for a specific Transaction.

Each entity can be supported by a table in the database. The tables corresponding to the Transaction entity and Transaction_Dtl entity are the Transaction table in FIG. 1B and Transaction_Dtl table in FIG. 1C. (FIG. 1C is a physical schematic representation of the Entity entitled Transaction_Dtl, the various information fields thereof, the type of information contained therein, and the relationships contained therein.) The first field in the table is the attribute name. The second field is the sequence number for the attribute. The third field is a Boolean value indicating whether or not the attribute is optional. The fourth field is the physical format of the attribute; the fifth field is the length of the attribute; and the sixth field is the number of decimal places.

Some sample data for Transaction and for Transaction_Detail are shown in FIGS. 1D and 1E. The column headings in FIGS. 1D and 1E are the attributes in the Entity-Relationship Diagrams. In the Transaction table, there are two types of transactions; their names are "buy product transaction," and "sell product transaction." The Transaction_Detail table consists of three details. The first transaction detail is that a product was bought on Nov. 1, 1999; the second transaction detail is that a product was bought on Nov. 5, 1999; and the third transaction detail is that a product was sold on Nov. 1, 1999.

A preferred embodiment of the invention is described here, with reference to FIGS. 2 through 5.

FIG. 2 is an overview of an embodiment of the present invention. In general, the system of the present invention (hereinafter "the Customization System") may be realized in a variety of ways depending on the enabling technology available at the time of realization, and particular application requirements at hand. In the illustrative embodiment, the System is realized as a decentralized network of computers, but it could also be implemented in a centralized computing environment.

As shown in FIG. 2, a computer system 100 includes a rule engine 102 which enforces the business rules stored in the data model 104. The application of the rule engine 102 using the data model 104 to a user's input 106 produces a database 108.

Figure 3A:
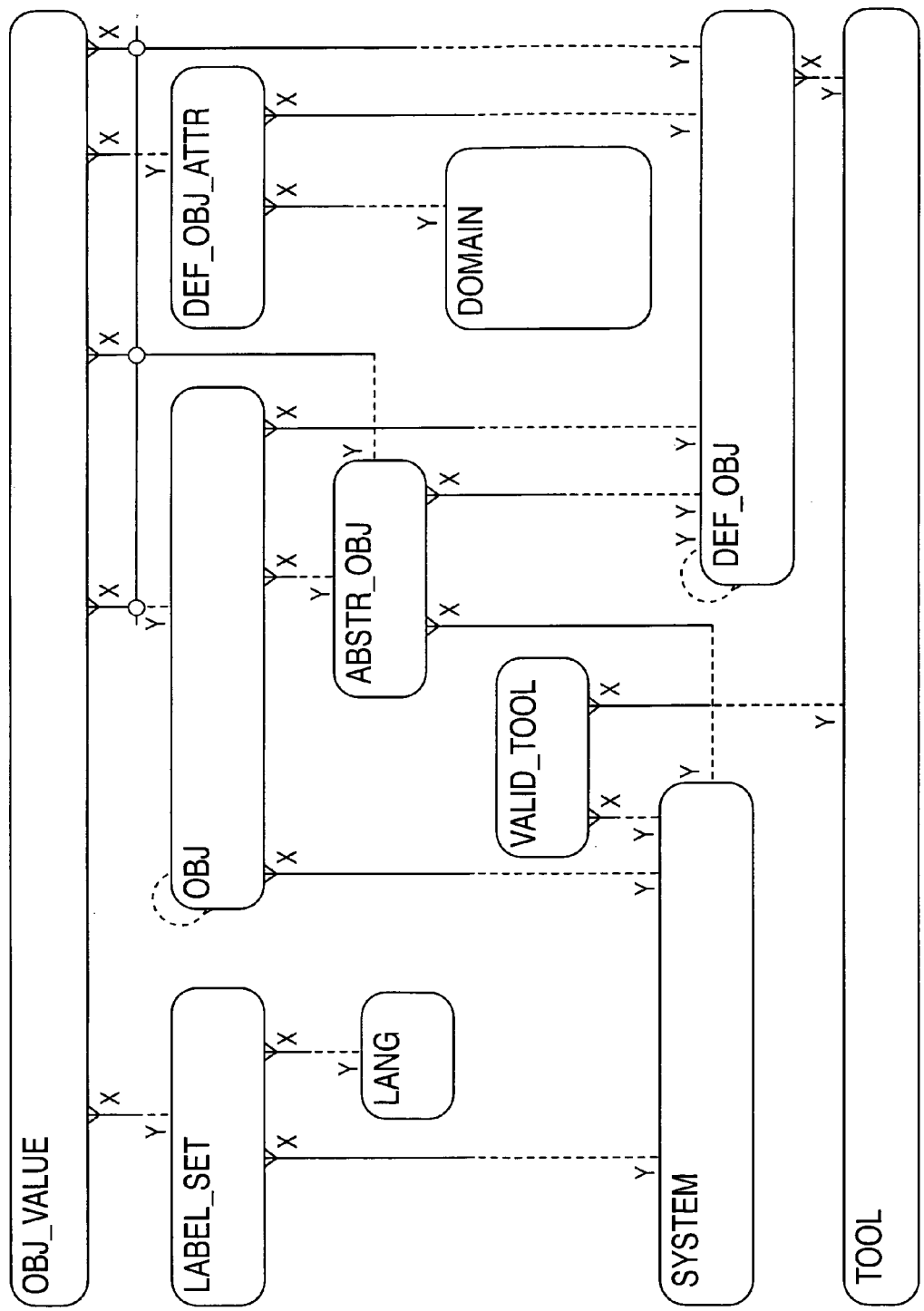
FIG. 3A is the overall logical, entity-relationship diagram (a schematic diagram) of the relational database design (the data model) used in the construction of an illustrative embodiment of the overall application of the present invention.
Figure 3B:
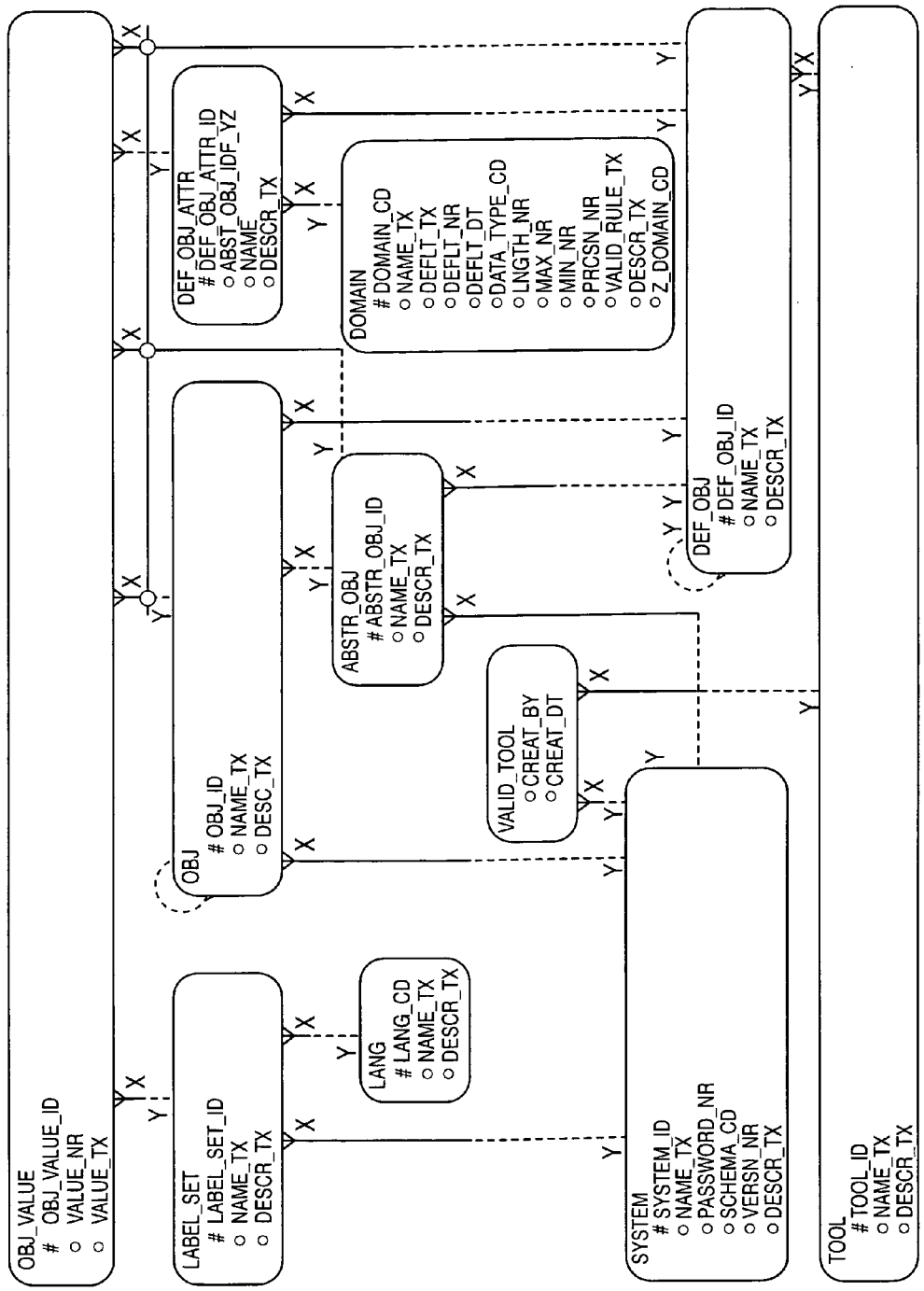
FIG. 3B is the detailed logical, entity-relationship diagram (a schematic diagram) of the relational database design (the data model) used in the construction of an illustrative embodiment of the overall application of the present invention.

FIG. 3A is a logical, entity-relationship diagram (a schematic diagram) of the relational database design used in the construction of an illustrative embodiment of the overall application of the present invention. FIG. 3A shows the entities and the relationships between the entities, and the important characteristics and advantages of the design. FIG. 3B describes, in detail, the attributes that are associated with each entity.

A tool allows a person to identify the software products or development environments that are to be supported, in the entity Tool (Tool). Each tool represents a different software development product used to build a program. The significance of this design is that it allows a person to maintain user preference information about a number of products.

A defined object allows a person to store information about a product element of any tool, that is, any software product or development environment, in the entity Defined Object (Def_Obj). A defined object is a type of element or component for a given tool. Each defined object represents a different component or element, for a given tool. The defined objects can be associated together or structured in a hierarchical manner. Together, tool and defined object allow a person to describe the types of objects and their structure, and have that information stored in a database, so that the defined objects and their structure can then be manipulated according to the usual database operators.

A system allows a person to specify a logical collection of software applications, in the entity called System (Systm). A system consists of a set of programs potentially spanning multiple tools gathered together in a logical whole. Each system represents a different complete software application that is supported.

A valid tool allows a person to identify which tool has been or could be used to develop a particular system, in the entity Valid Tool (Valid_Tool). The significance of this design is that it allows a person to specify what are the valid tools associated with a particular system. Different systems can be developed using different tools.

An object allows a person to specify an actual component of an actual system listed in the system entity, in the entity Object (Obj). Similarly to defined objects, objects can be classified in a hierarchical structure. Each object allows a person to specify actual components of systems and how they are structured hierarchically.

An abstract object allows a person to specify a generic object, in the entity Abstract Object (Abstr_Obj). An abstract object can be specified when a person wants to group together objects which have similar characteristics to each other. However, those objects may not have the same name in the different contexts, and there may be no easy way to identify that these objects all represent the same logical structure. To achieve this, the user declares that all of the objects associated with an object are attached to the same abstract object. By grouping them together in abstract object, a person can declare the value of an attribute for an abstract object and it will automatically be inherited by every one of its associated objects.

A language allows a person to specify the languages that are permissible or can be supported, in the entity Language (Lang). The label set allows a person to specify which languages are associated with a particular system, in the entity Label Set (Label_Set). The significance of this entity is that is allows the labels in the user interface to appear in multiple languages, but with a single set of screens. In traditional system design, a second set of screens would be required to support a second language.

A domain allows a person to define the set of values from which an attribute may be drawn, in the entity Domain (Domain). A domain is a complex data type, that is, it is more than a simple data type such as string or number.

A defined object attribute allows a person to specify which attributes are associated with which defined object or abstract object, and its associated domain, in the entity Defined Object Attribute (Def_Obj_Attr). The significance of this entity is that it allows a user to describe the attributes which determine how the defined objects or abstract objects can be manipulated.

Object value allows a user to specify what is the value of a particular attribute in a particular context, for a particular object, defined object, or abstract object, in the entity Object Value (Obj_Value). Object value supports a kind of object orientation so that a user can set the property globally by associating the value with the defined object. If there is a value for the same object at the abstract level, this value would override the defined level. The object level value will override both the abstract and defined levels.

This repository was initially designed to support multilingual labels. The label set entity stores which language is associated with a particular system. The values of the different labels are stored in object value. In other words, the different names of the labels in the different languages are stored in the object value entity and table.

Even though this repository was originally designed to support multilingual labels, it can also be used for other tasks as well, because in supporting multilingual labels, it also supports run-time modification of any attribute on any object in a program. One particularly useful application of this technology is in supporting help messages. Help messages are textual strings, which can be accessed while an application is running. These messages are context-sensitive, meaning that depending upon the object in the application, a different help message may be appropriate. In the context of the present invention, the help text can be viewed as simply another attribute, just like the label, or a particular object thus their repository is able to support storage of help message text without modification. Help text is stored in object value, with a defined object type of help text. This mechanism is particularly powerful since the help text is no longer embedded in application code. Therefore, help text data entry can be more safely assigned to non-technical users.

Error messages are similar to help messages, in that these messages are represented as another text field. With help messages, the help message was simply an additional attribute, which was then associated with existing system objects in the object table. Help was defined for specific things, such as the employee block, and not the block in general. With error messages, the process is somewhat different.

For error messages, it is necessary to create a new defined object, namely, that of an error event. There will be a separate error event for each unique error exception in the system. Error events may be defined system level, or, likely any other object, may be defined as residing recursively under any other object. The error text is stored in the object value table, just like all other values. Similarly to the help message procedure, non-technical users can maintain the actual text of error messages.

Not only can the architecture of the Customization System of the present invention support multilingual labels and unique textual messages, it can also support security. Frequently, different classes of users need to have different access to different applications, or different capabilities with respect to applications. There are four aspects to security that this system supports. First, there is application access, i.e. access to the programs themselves. Second, there is field-level security, which is the visibility or capability to edit specific fields in the application. Third, there is program unit control, which is the ability to execute any function in the system. Fourth, there is the ability to control the passing of parameters to the application which the program then uses to programmatically alter its behavior.

These four mechanisms support a rich security environment with all the necessary information stored in the repository. In its basic form, the implementation of application security is much the same as the other areas previously described, in that at run-time, users can change the properties of objects. For example, if users want to change a field's label, they simply change the label property of the field. If users want to make the field invisible or editable, they simply change the value of the invisible or updatable property. The security areas each have to be handled using similar, but slightly different, mechanisms. To control access to the applications, users can disable the buttons that invoke those applications. Then, field-level security is as described above. Program unit access is handled by creating a new defined object called security event. For each place in the application where users want to check security, they can create another object, and enter a value of true or false in the label set. The method of implementation in some products is that developers write a single line of code called check security where they pass the name of the security object to the function, which automatically aborts the procedure resulting in an error message if security is inadequate. For number four, passing parameters is very simple. The security parameter is just another type of direct object, and the values are stored in the value table in the usual way.

Finally, the design and architecture of the Customization System of the present invention also support user preferences, including display preferences. Each field and label on the display can be customized, as each field can have its own unique individual preferences, that is, visual attributes, such as fonts, color, background, height of all buttons or other visual attributes.

Specification of the Information Structures
Comprising the Database of the Present Invention FIGS. 4-A to 4-K are physical schematic representations of various Entities, the various respective information fields thereof, the type of information contained therein, and the relationships contained therein.

FIG. 4-A is a physical schematic representation of the Entity entitled Tool, the various information fields thereof, the type of information contained therein, and the relationships contained therein;

FIG. 4-B is a physical schematic representation of the Entity entitled Def_Obj, the various information fields thereof, the type of information contained therein, and the relationships contained therein;

FIG. 4-C is a physical schematic representation of the Entity entitled Systm, the various information fields thereof, the type of information contained therein, and the relationships contained therein;

FIG. 4-D is a physical schematic representation of the Entity entitled Valid_Tool, the various information fields thereof, the type of information contained therein, and the relationships contained therein;

FIG. 4-E is a physical schematic representation of the Entity entitled Obj, the various information fields thereof, the type of information contained therein, and the relationships contained therein;

FIG. 4-F is a physical schematic representation of the Entity entitled Abstr_Obj, the various information fields thereof, the type of information contained therein, and the relationships contained therein;

FIG. 4-G is a physical schematic representation of the Entity entitled Lang, the various information fields thereof, the type of information contained therein, and the relationships contained therein; and FIG. 4-H is a physical schematic representation of the Entity entitled Label_Set, the various information fields thereof, the type of information contained therein, and the relationships contained therein; and FIG. 4-I is a physical schematic representation of the Entity entitled Domain, the various information fields thereof, the type of information contained therein, and the relationships contained therein.

FIG. 4-J is a physical schematic representation of the Entity entitled Def_Obj_Attr, the various information fields thereof, the type of information contained therein, and the relationships contained therein.

FIG. 4-K is a physical schematic representation of the Entity entitled Obj_Value, the various information fields thereof, the type of information contained therein, and the relationships contained therein.

With reference to FIG. 4A, the user defines the tool by specifying the following attributes in a database table. First, each tool needs to have a unique identifier. This is done by specifying Tool_CD as the primary key. The system automatically generates the value for this field, and does so for all primary keys throughout the entire invention. Second, the user has the option of specifying the name of the rule in the attribute Name_TX. The user also has the option of specifying a description of the attribute in Descr_TX.

With reference to FIG. 4B, the user identifies the defined objects by specifying the following attributes in a database table. First, each defined object needs to have a unique identifier. This is done by specifying Def_Obj_ID as the primary key. The user then has the option of specifying the name of the defined object in the attribute Name_TX. Finally, the user has the option of specifying a description of the defined object in the attribute Descr_TX.

With reference to FIG. 4C, the user defines a system by specifying the following attributes in a database table. First, each system needs to have a unique identifier. This is done by specifying Systm_ID as the primary key. The user has the option of specifying a name of the system, in the attribute Name_TX. The user then has the option of specifying a description of the system, in the attribute Descr_TX. Next, the user can specify the password of the system, in Password_NR. Subsequently, the user can specify the schema of the system, in the attribute Schema_CD, and the version of the system, in Version_NR.

With reference to FIG. 4D, the user specifies which tool is associated with which system by specifying the following attributes in a database table. First, each valid tool needs to have a unique identifier. This is done by specifying Valid_Tool_ID as the primary key. The user specifies the tool, by using Tool_CD as a foreign key from Tool, resulting in Tool_CD_FK. The user than specifies the system, by using Systm_ID as a foreign key from Systm, resulting in Systm_ID_FK. The user has the option of specifying when the valid tool was created, in the attribute Creat_DT, and the person the valid tool was created by, in the attribute Creat_BY.

With reference to FIG. 4E, the user specifies which defined object is used with which system, by specifying the following attributes in a database table. First, each object needs a unique identifier. This is done by specifying Obj_ID as the primary key. The user then has the option of specifying the name of the object, in Name_TX. The user then has the option of specifying a description of the object, in Descr_TX. The user then specifies the system, by using Systm_ID as a foreign key from Systm, resulting in Systm_ID_FK. Finally, the user specifies which defined object is relevant, by using Def_Obj_ID as a foreign key from Def_Obj, resulting in Def_Obj_ID_FK.

With reference to FIG. 4F, the user determines an abstract object, by specifying the following attributes in a database table. First, each abstract object needs to have a unique identifier. This is done by specifying Abstr_Obj_ID as the primary key. The user can then specify the name of the abstract object, in the attribute Name_TX. Next, the user has the option of specifying a description, in the attribute Descr_TX. Finally, the user specifies which system the abstract object is associated with, by using Systm_ID as a foreign key from Systm, resulting in Systm_ID_FK.

With reference to FIG. 4G, the user identifies the language by specifying the following attributes in a database table. First, each language needs to have a unique identifier. This is done by specifying Lang_CD as the primary key. The user then has the option of specifying the name of the language, in the attribute Name_TX. Finally, the user can specify a description of the language, in the attribute Descr_TX.

With reference to FIG. 4H, the user specifies which language is used with which system, by specifying the following attributes in a database table. First, each label set needs to have a unique identifier. This is done by specifying Label_Set_CD as the primary key. The user then has the option of specifying the name of the label set, in Name_TX. The user then has the option of specifying a description of the label set, in Descr_TX. The user then specifies the system, by using Systm_ID as a foreign key from Systm, resulting in Systm_ID_FK. Finally, the user specifies which language is relevant, by using Lang_CD as a foreign key from Lang, resulting in Lang_CD_FK.

With reference to FIG. 4I, the user determines the domain by specifying the following attributes in a database table. First, each domain needs to have a unique identifier. This is done by specifying Domain_CD as the primary key. The user then has the option of specifying the name of the domain, in the attribute Name_TX. The user can then specify a description of the domain, in the attribute Descr_TX. Next, the user has the option of entering what the data type of the domain is, in the attribute Data_Type_CD. Next, the user has the option of entering a default date, a default number, or a default text, in the attributes Deflt_DT, Deflt_NR, or Deflt_TX, respectively. The user can then enter the length of the domain, in the attribute Lngth_NR. Next, the user can specify the precision of the domain, in the attribute Prcsn_NR. The user then has the option of specifying a minimum value and a maximum value for the domain, in the attributes Min_NR and Max_NR, respectively. Next, the user can specify the type of domain, in the attribute Z_Domain_CD. Finally, the user has the option to enter a valid rule, in the attribute Valid_Rule_TX.

With reference to FIG. 4J, the user then identifies which defined objects are associated with which domains, by specifying the following attributes in a database table, Def_Obj_Attr. First, each defined object attribute needs to have a unique identifier. This is done by specifying the attribute Def_Obj_Attr_ID to be the primary key. The user can then specify the name of the defined object attribute, in the attribute Name_TX. Next, the user has the option of entering a description of the defined object attribute, in Descr_TX. The user can then enter an xxx in the attribute Abst_Obj_IDF_YN. Next, the user then specifies the defined object of interest, by using Def_Obj_ID as a foreign key from Def_Obj, resulting in Def_Obj_ID_FK. The user then specifies the domain of that defined object attribute, by using Domain_CD as a foreign key from Domain, resulting in Domain_CD_FK.

With reference to FIG. 4K, the user then determines the value of the object, by specifying the following attributes in a database table, Obj_Val. First, each object value needs to have a unique identifier. This is done by specifying the attribute Obj_Val_ID to be the primary key. Next, the user has the option of specifying a numeric value, in the attribute Value_NR. The user then has the option of specifying a text value, in the attribute Value_TX. The user then determines which object the value is associated with, by specifying either the object, defined object, or the abstract object, by using Obj_ID, Def_Obj_ID, and Abstr_Obj_ID as foreign keys from Obj, Def_Obj_Attr, and Abstr_Obj, resulting in Obj_ID_FK, Def_Obj_ID_FK, and Abstr_Obj_ID_FK, respectively.

The significance of these eleven entities is that they are sufficient to capture and represent any data structure business rules, as well as other types of business rules, at a high level of abstraction, with a corresponding depth of flexibility and increase in design, development, and implementation efficiency. The repository, as specified in FIGS. 4A–4K, store multilingual labels, error messages, context-sensitive help messages, security, and client preferences.

Figure 5A:
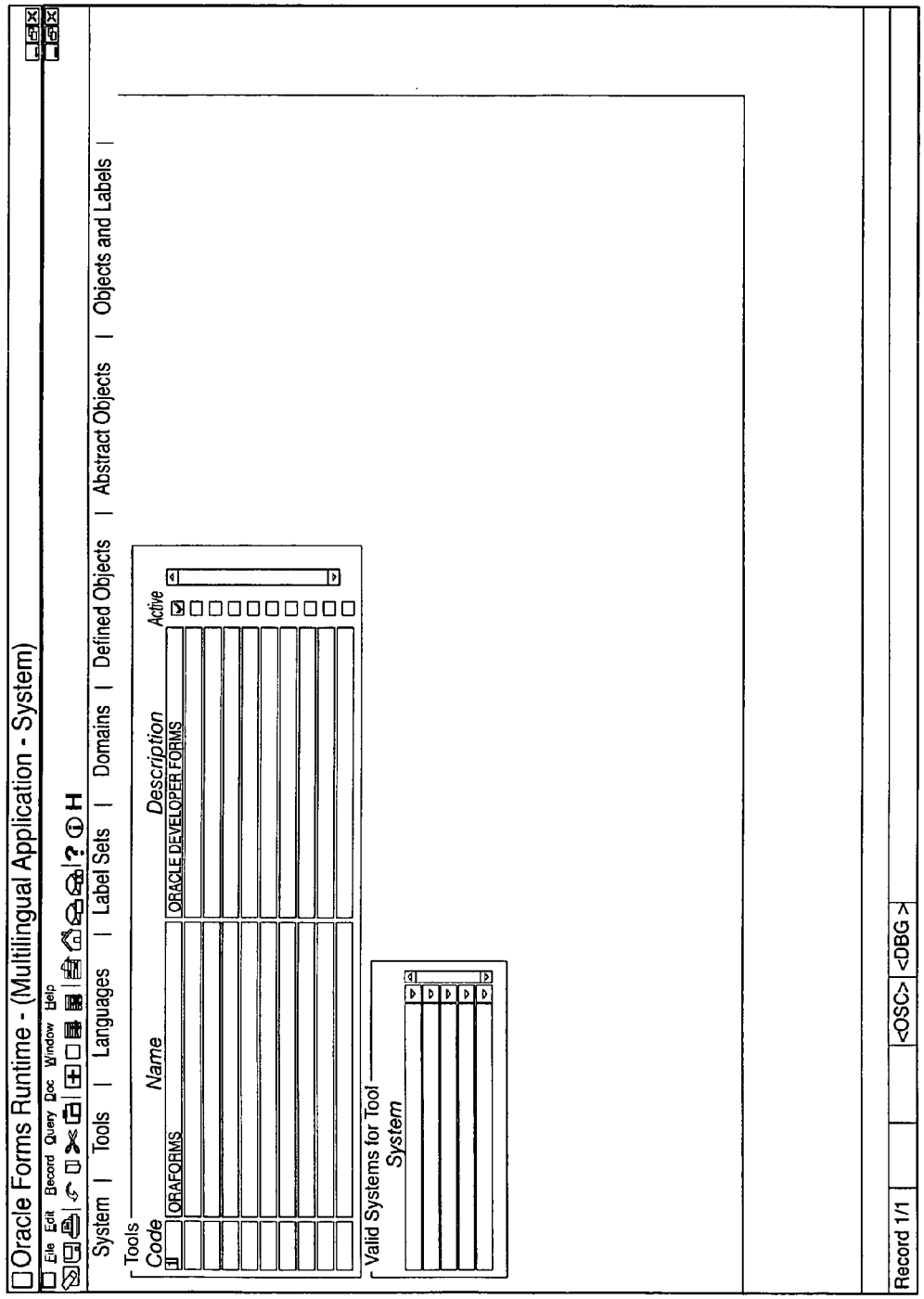
FIGS. 5-A to 5-N are graphical display representations which are used by the present invention to enter tools, label sets, and systems.

Graphical Display of the Screens Supporting the Information Structures Comprising the Database of the Present Invention FIGS. 5-A to 5-N show a graphical display by which users can enter information related to tools, labels sets, and systems. More specifically, FIG. 5-A is a graphical display to enter information into the entity and table called Tool;

FIG. 5-B is a graphical display to view information of the entity and table called Defined Object;

FIG. 5-C is a graphical display to enter information into the entities and tables called Defined Object and Defined Object Attribute;

FIG. 5-D is a graphical display to enter information into the entity and table called Label Set;

FIG. 5-E is a graphical display to enter information into the entities and tables called Object and Object Values;

FIG. 5-F is a graphical display to enter information into the entities and tables called Defined Object and Object Values;

FIG. 5-G is a graphical display to enter information into the entities and tables called Abstract Object and Object Values;

FIG. 5-H is a graphical display to enter information into the entity and table called System;

FIG. 5-I is a graphical display to enter language information into the entity and table called Label Set;

FIG. 5-J is a graphical display to enter security information into the entities and tables called Label Set and Security Object Role;

FIG. 5-K is a graphical display to enter information into the entity and table called Valid Tool;

FIG. 5-L is a graphical display to enter information into the entities and tables called Abstract Object and Abstract Object Values;

FIG. 5-M is a graphical display to view information of the entity called Object;

FIG. 5-N is a graphical display to enter information into the entities and tables called Object and Object Values;

With reference to FIG. 5A, the user can enter information that is stored in the entity, Tool. The user can enter a code in the field called Code, the name of the tool in the field called Tool, and a description in the field called Descr.

Figure 5B:
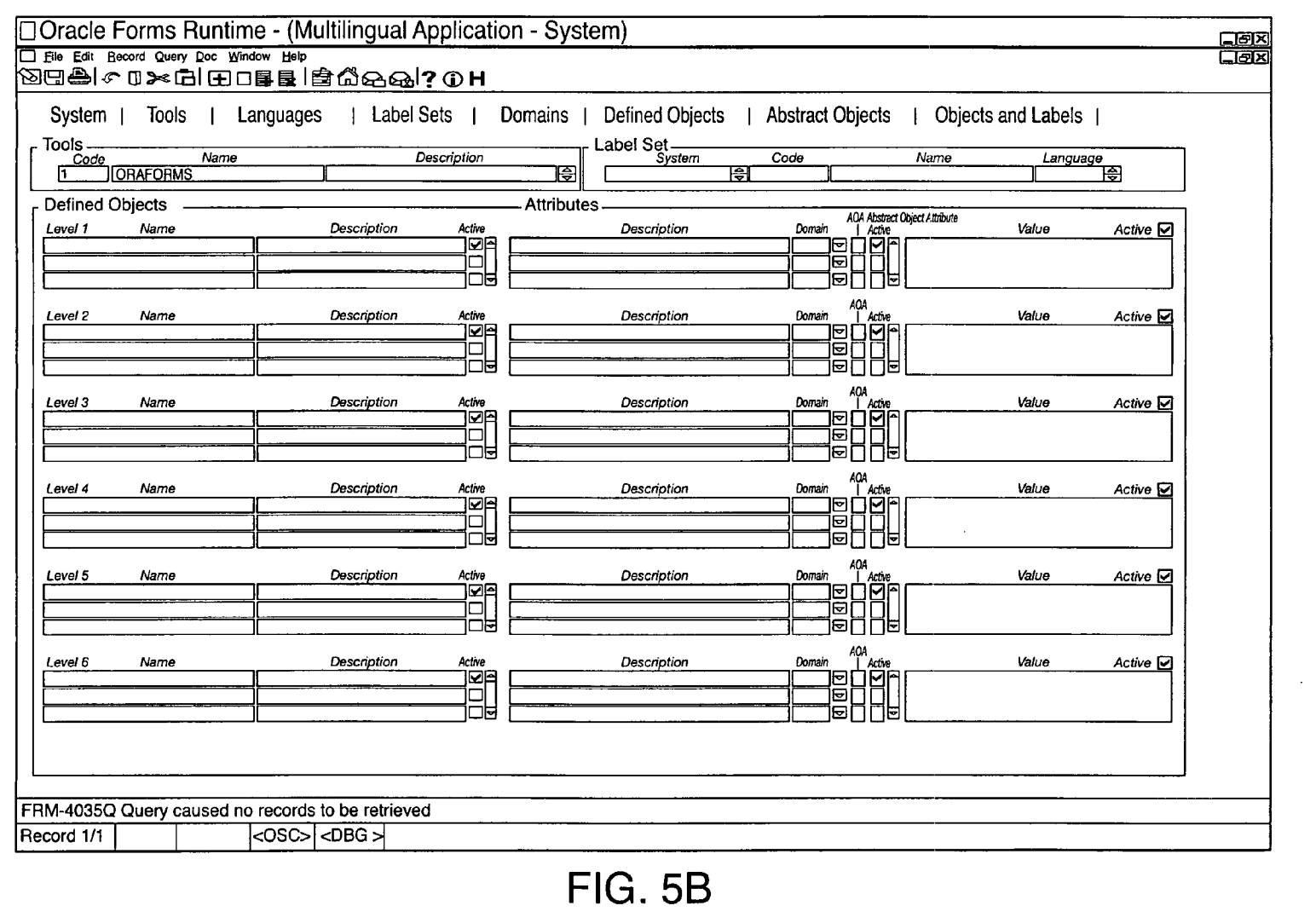

With reference to FIG. 5B, the user can view the hierarchical information that is stored in the Defined Object entity, for a particular tool.

Figure 5C:
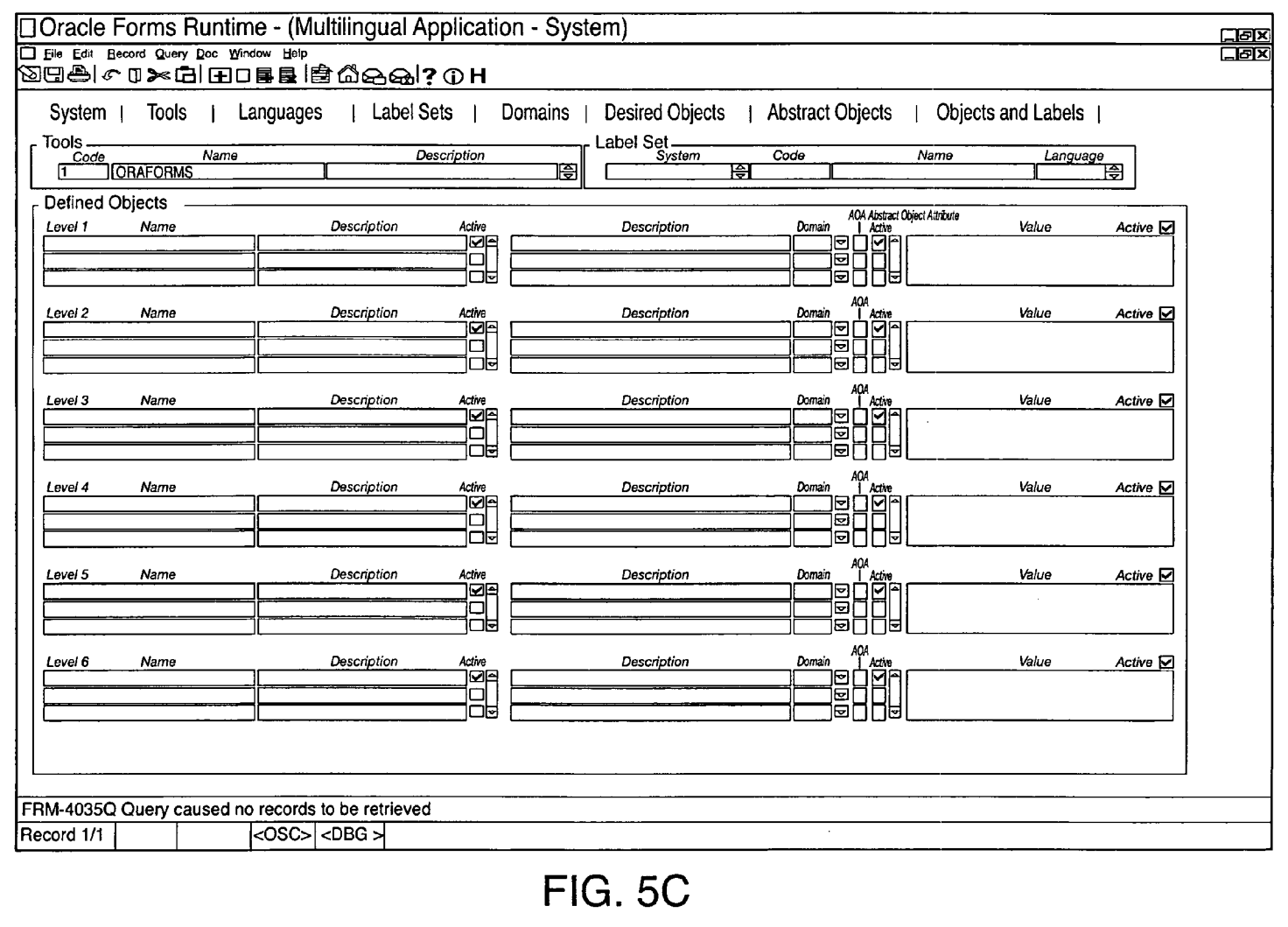

With reference to FIG. 5C, the user can enter the name of the defined object, in the field called Name, that is associated with a particular tool. The hierarchical information is stored in the following manner: The Defined Object (Name) of Level N is the parent of all the Defined Object (Names) of Level N+1. In addition, the user can enter the attributes which describe a particular defined object, for a particular tool, in the bottom half of the screen.

Figure 5D:
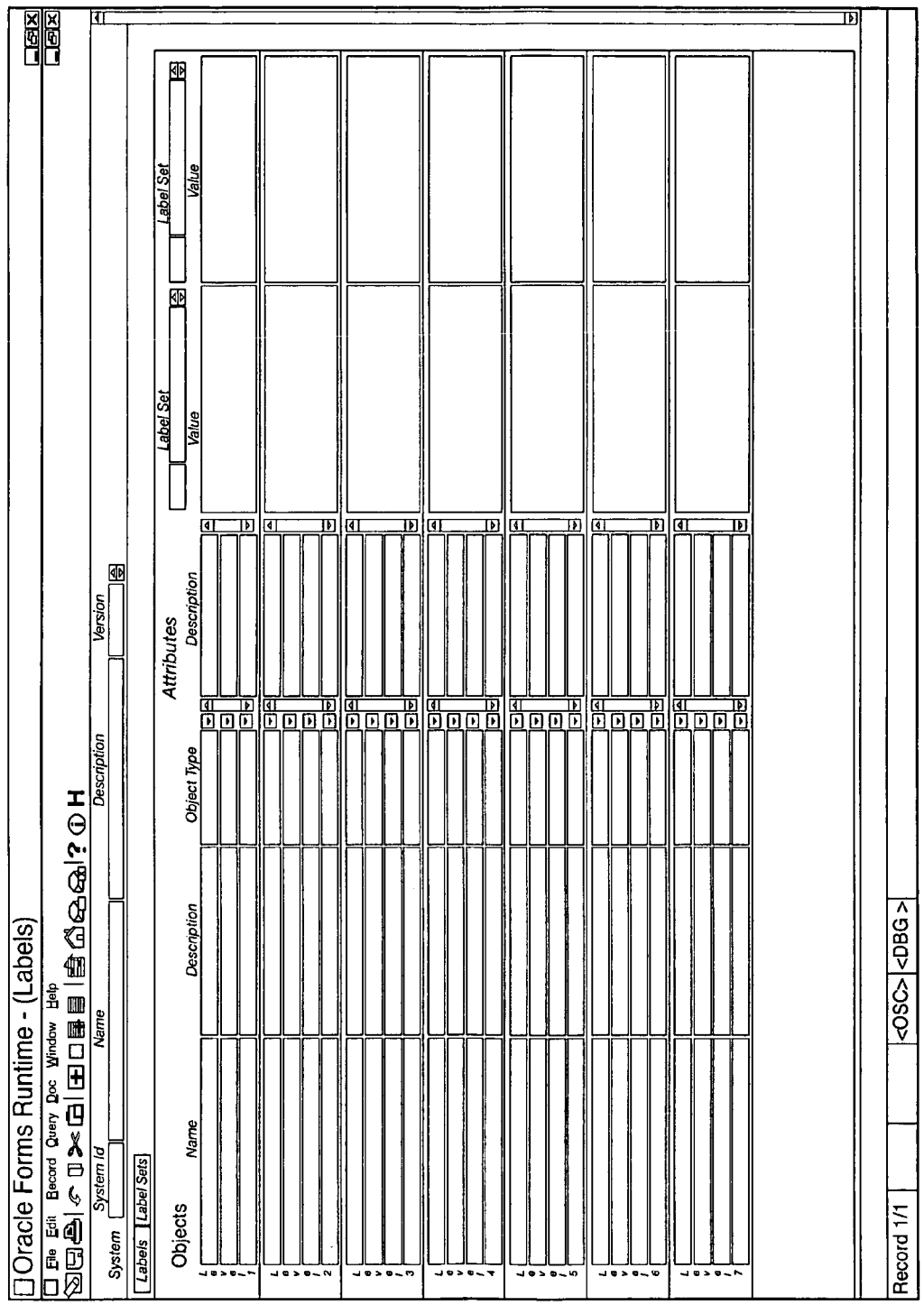

With reference to FIG. 5D, the user can enter information that is stored in the entity Label_Set. The user can enter the system ID in the field Systm_ID, a code in the field CD, the language in the field Lang, the name of the label set in the field Name, and a description of the label set in Descr.

Figure 5E:
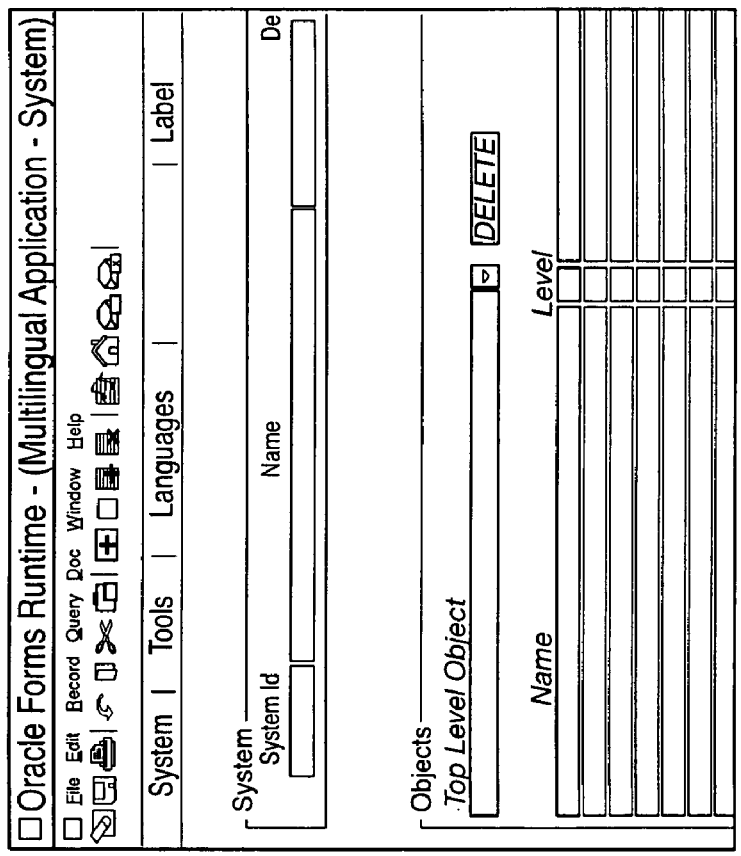

With reference to FIG. 5E, the user can enter information regarding a particular object, including the Tool_CD, ID, Def_Object, Name, and Descr. The user can also enter the values in the bottom half of the screen, in ID, Label Set/Language, Tool/Defined Object/Attribute, and Value.

Figure 5F:
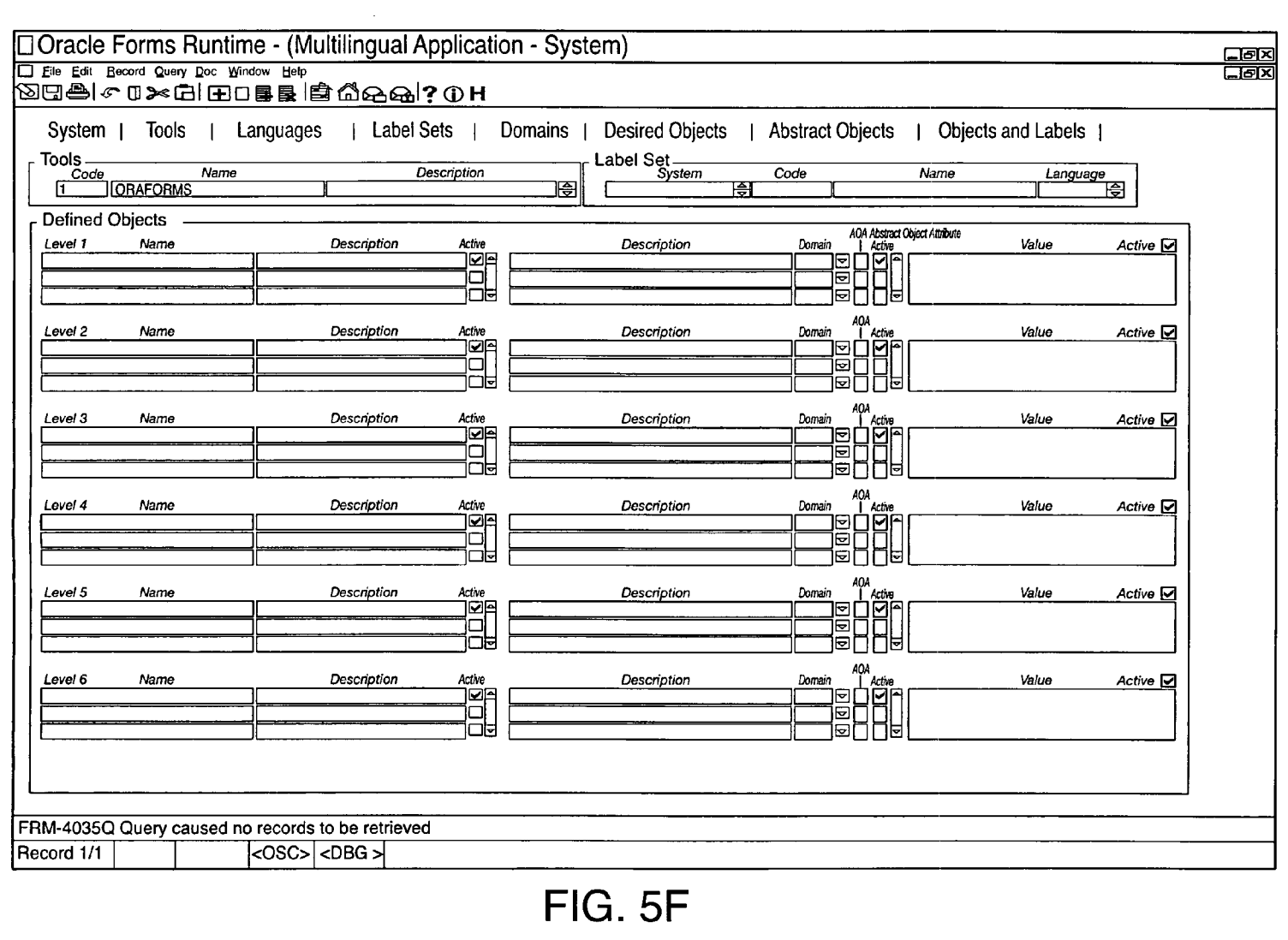

With reference to FIG. 5F, the user can display information regarding a particular defined object, including its hierarchical structure, and the attributes and values associated with each defined object, in the bottom half of the screen.

Figure 5G:
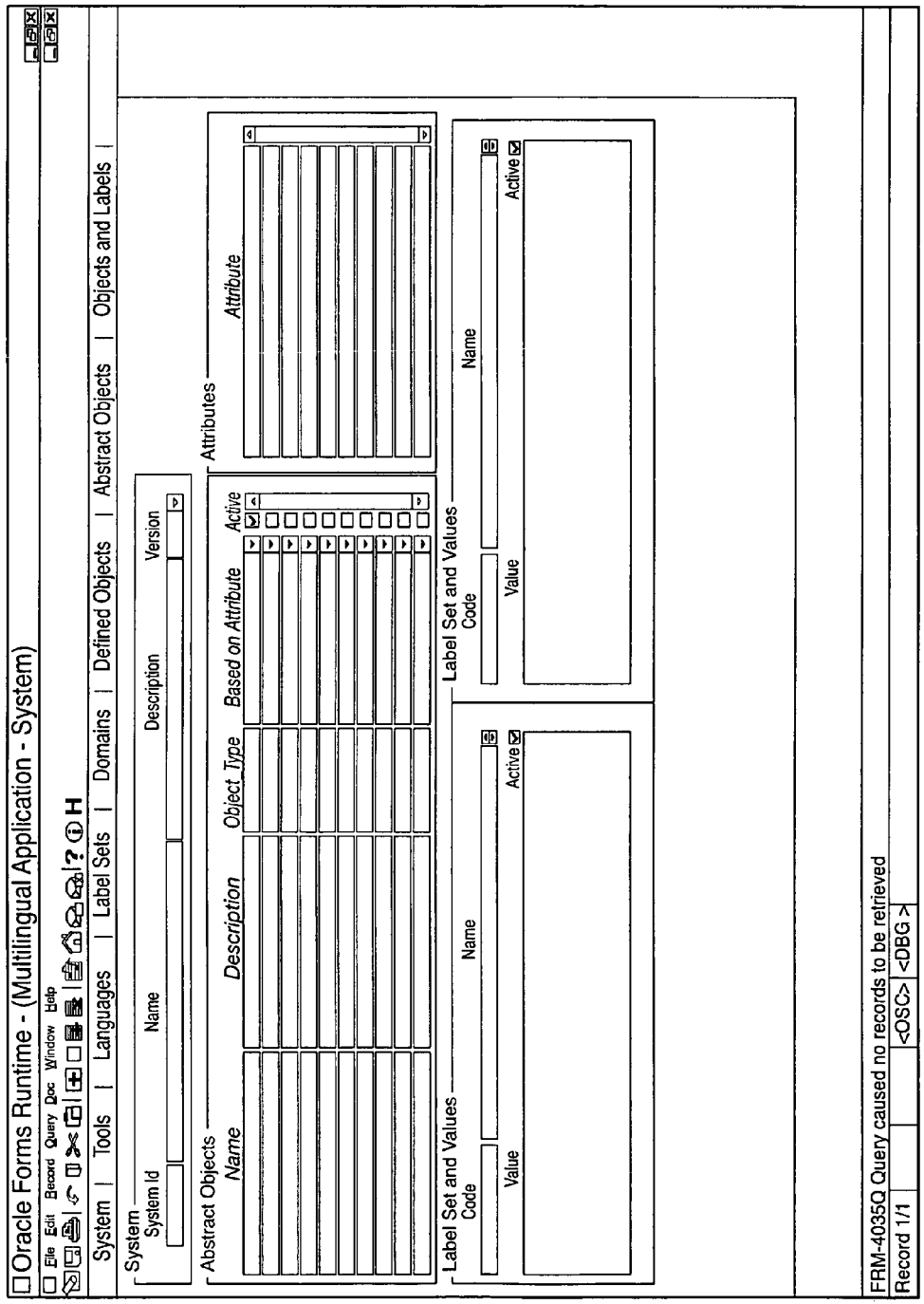

With reference to FIG. 5G, the user can display information regarding a particular abstract object, and enter information in the attributes and values associated with each abstract object, in the bottom half of the screen.

Figure 5H:
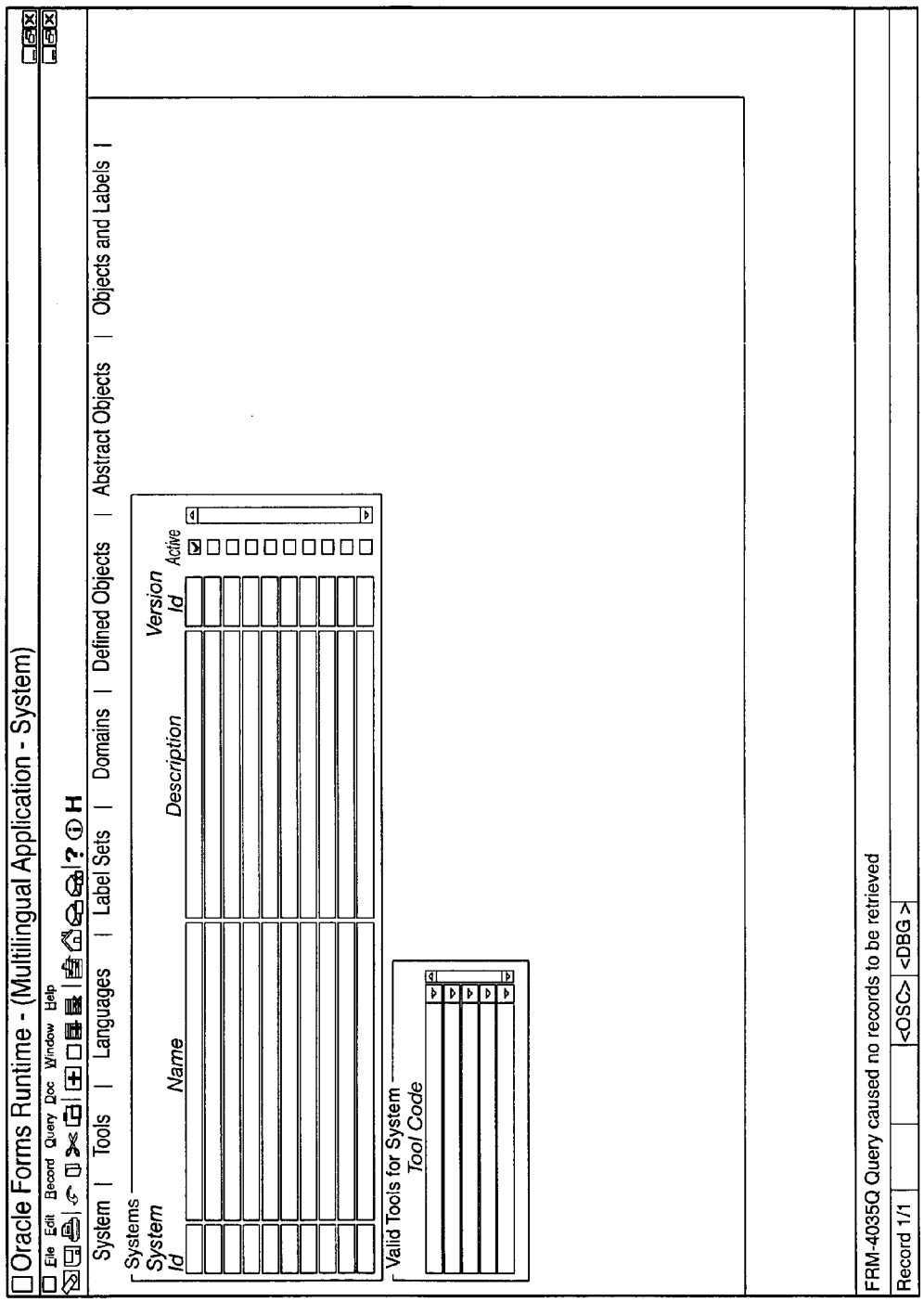
Figure 51:
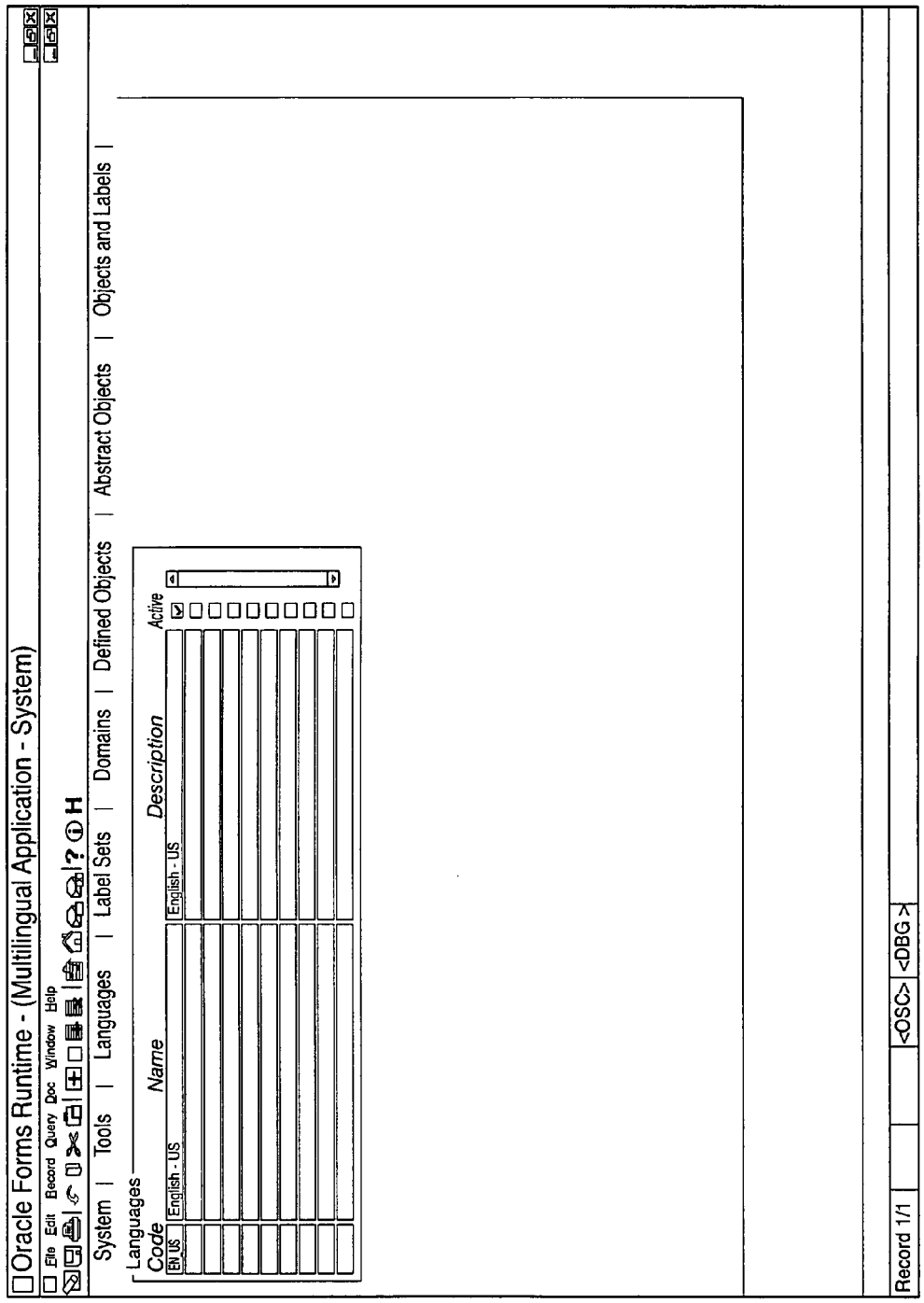

With reference to FIG. 5H, the user enters information regarding a particular system, in the entity System.

With reference to FIG. 5I, the user enters information regarding the language label set, in the entity Label Set.

Figure 5J:
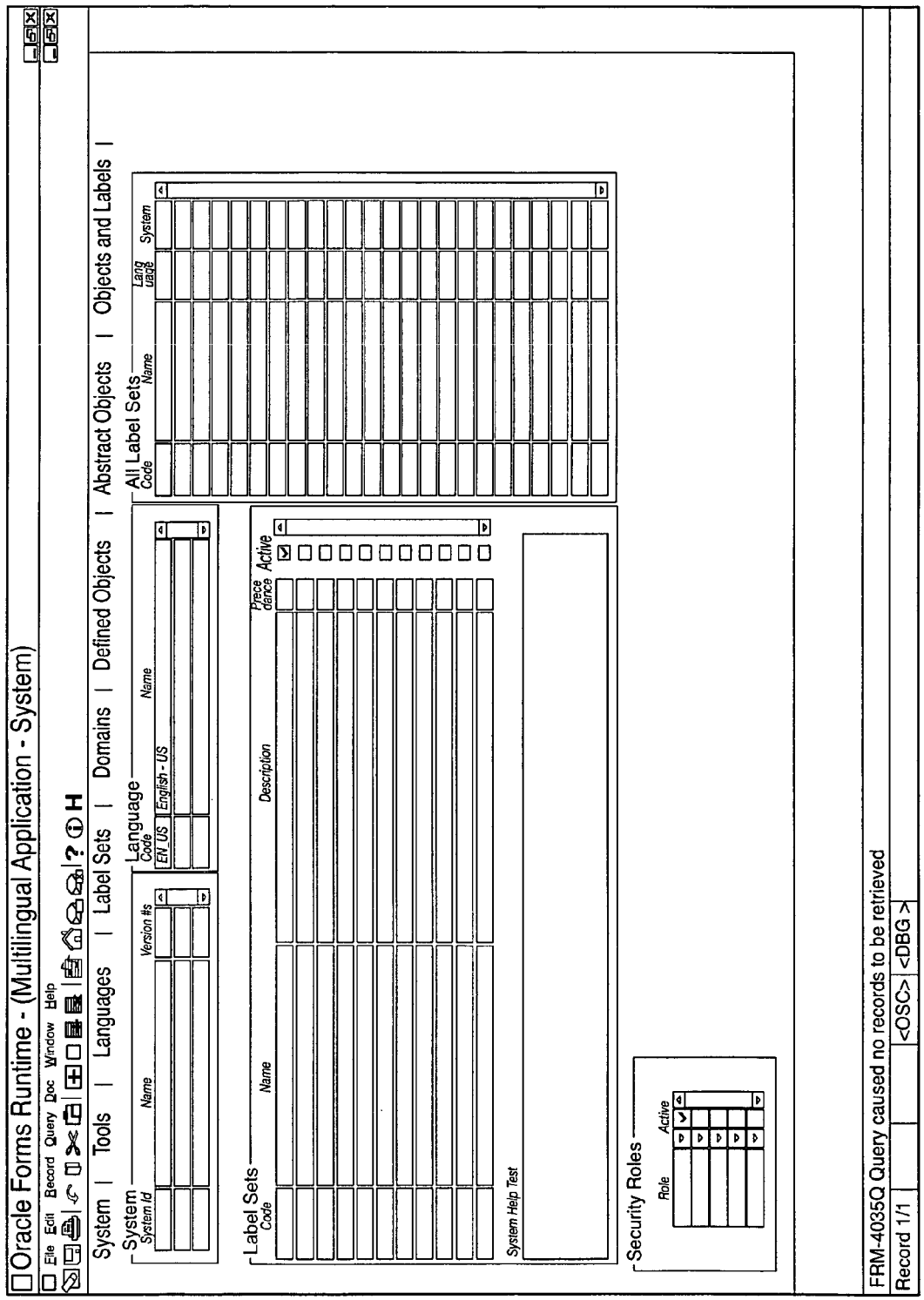

With reference to FIG. 5J, the user enters information regarding the security label set, in the entities Label Set and Security Object Role.

Figure 5K:
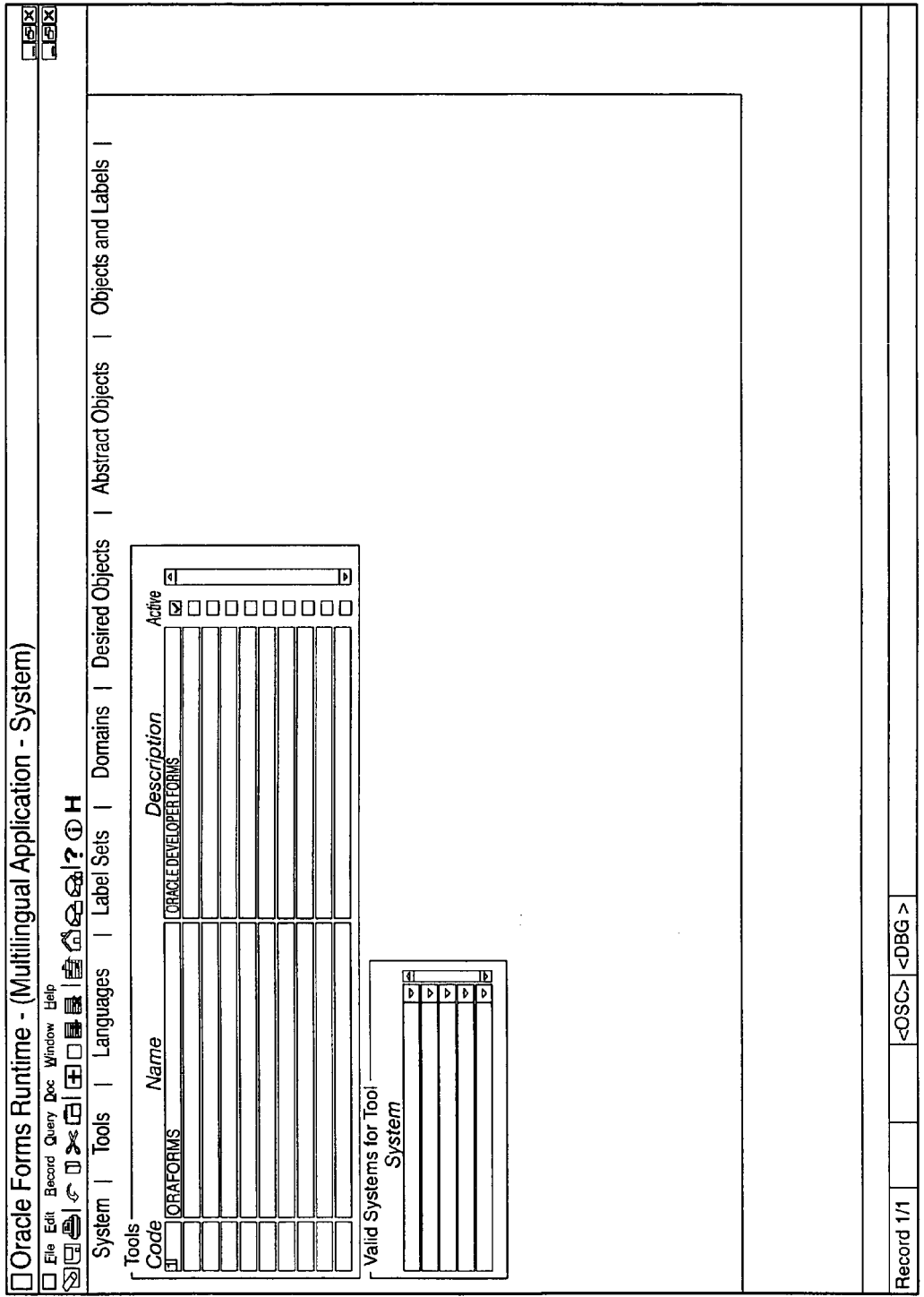

With reference to FIG. 5K, the user enters information regarding the valid tool, in the entity Valid Tool.

Figure 5L:
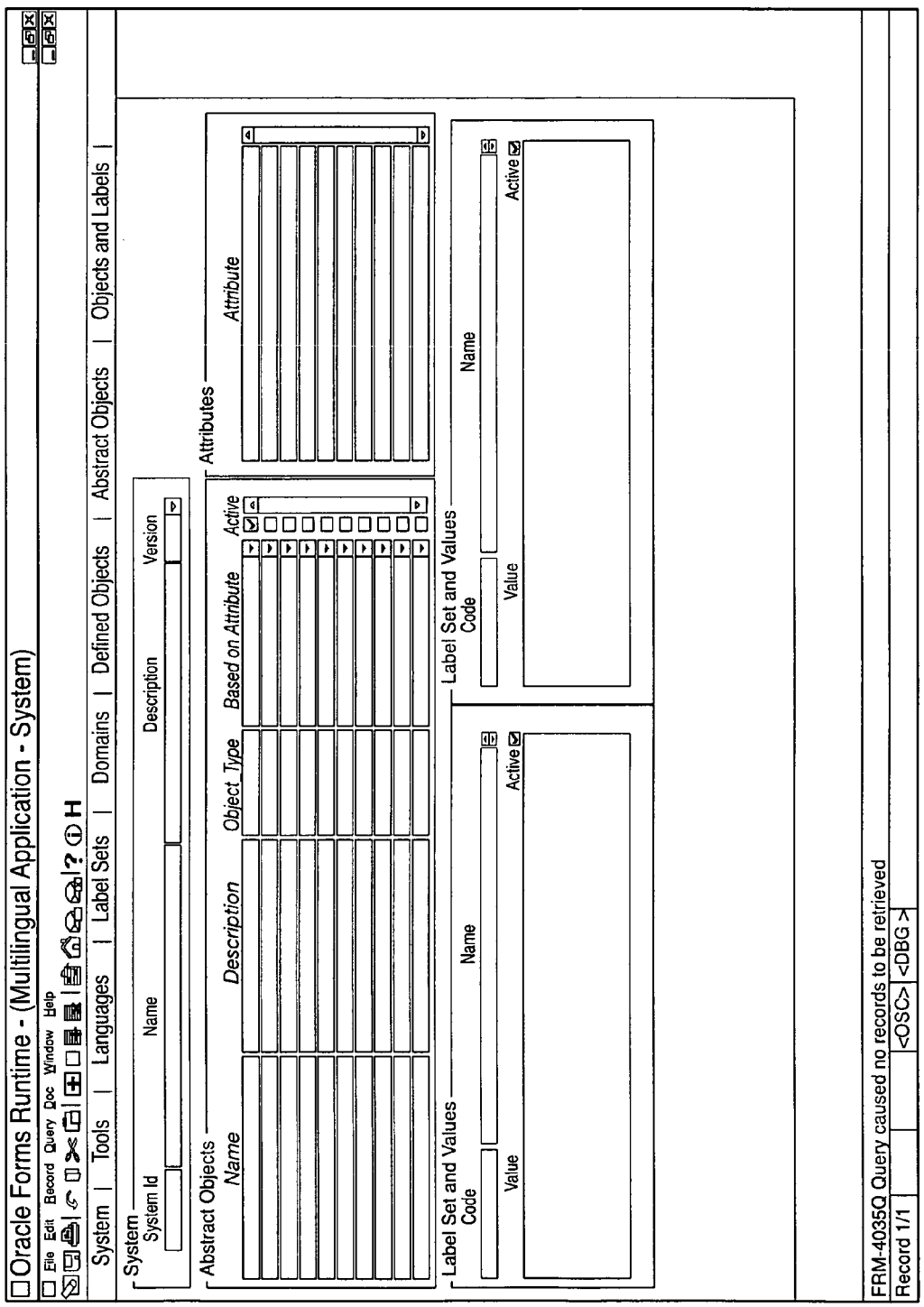

With reference to FIG. 5L, the user enters information regarding the abstract object and the attributes and values associated with that abstract object, in the entities Abstract Object and Abstract Object Values.

Figure 5M:
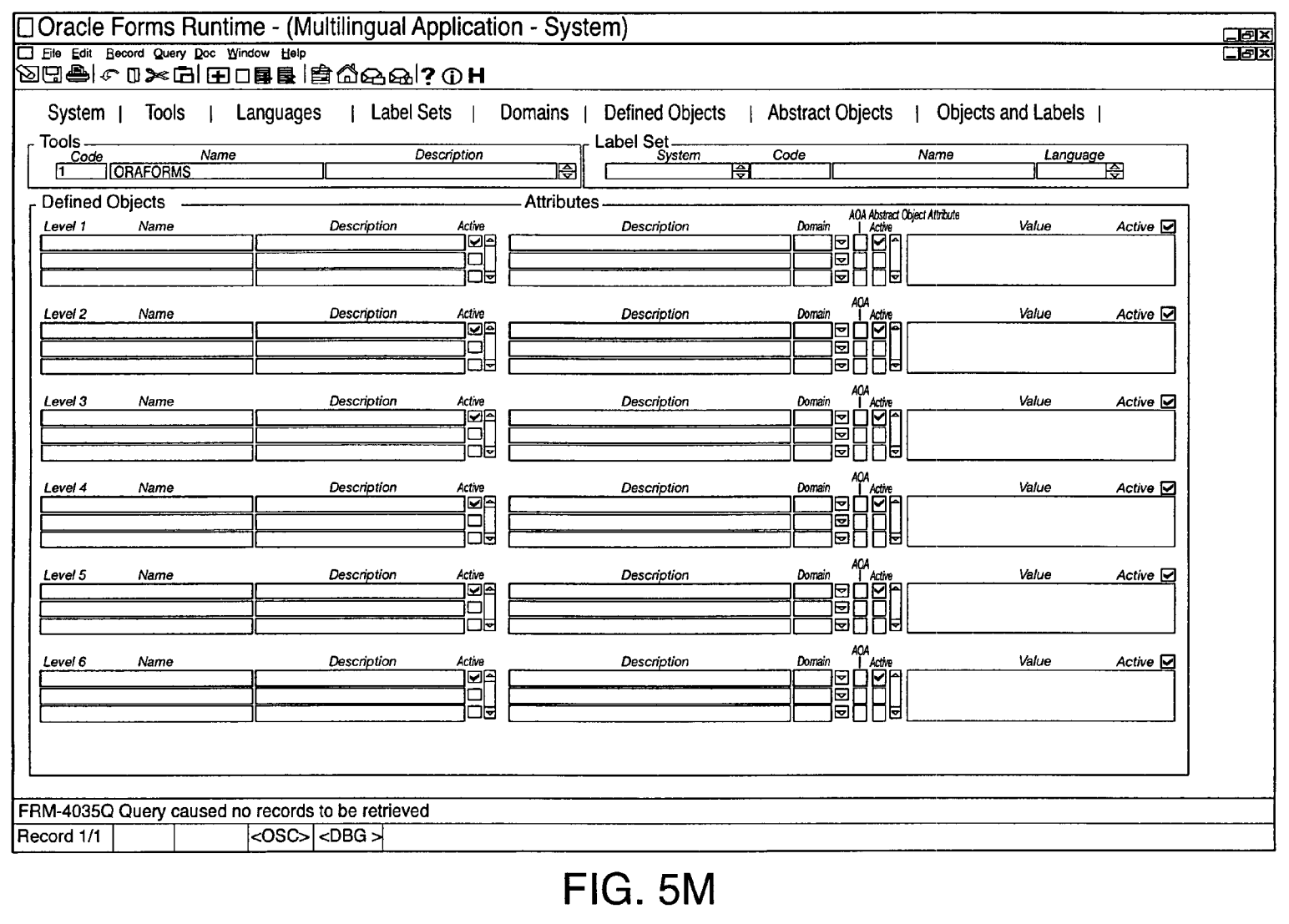

With reference to FIG. 5M, the user views information regarding the defined object and its hierarchical structure, in the entity Object.

Figure 5N:
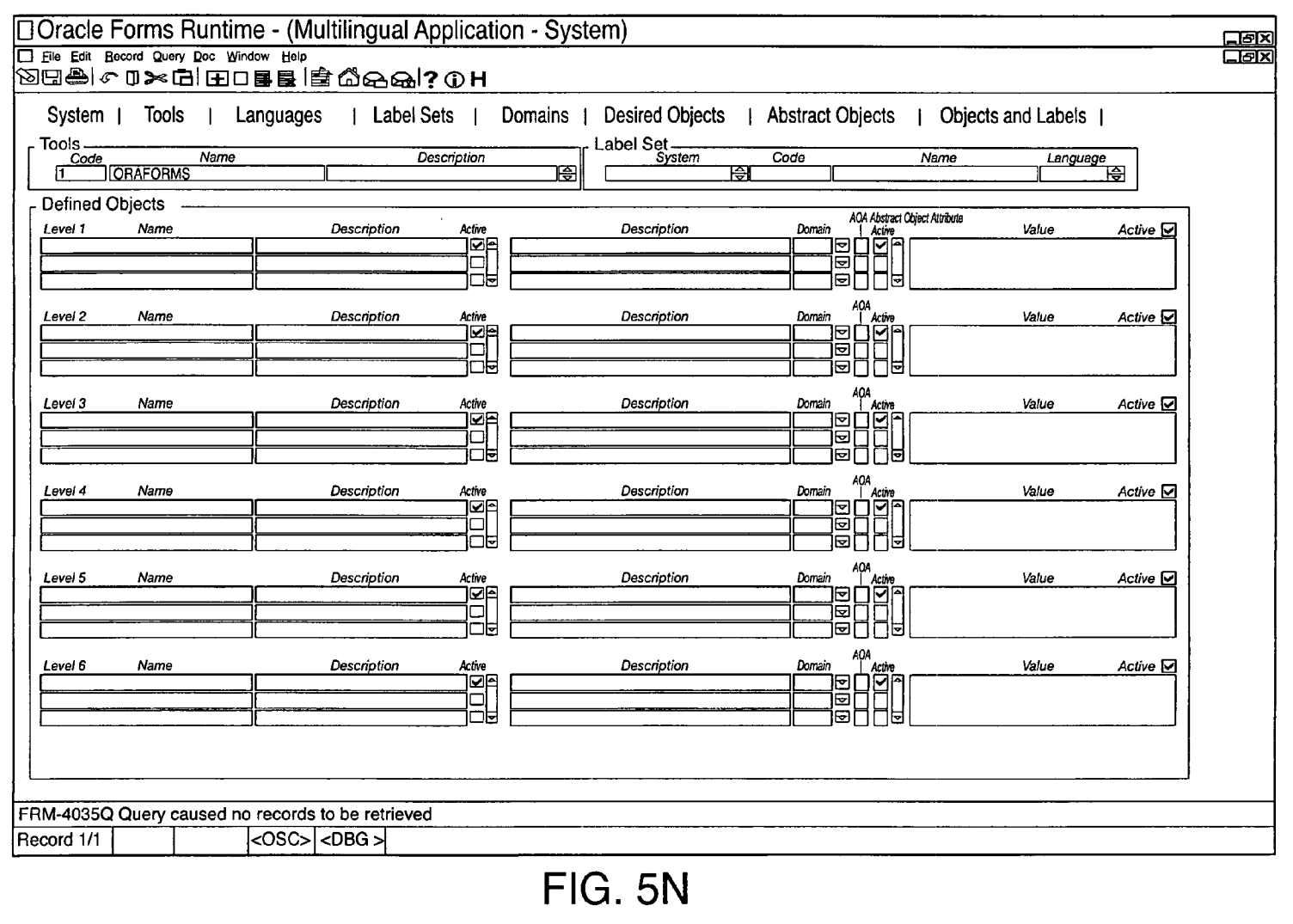

With reference to FIG. 5N, the user can enter information regarding the defined object and its hierarchical structure, as well as the values associated with it, in the entities Object and Object Values.

METHOD OF USING THE PRESENT INVENTION

Figure 6:
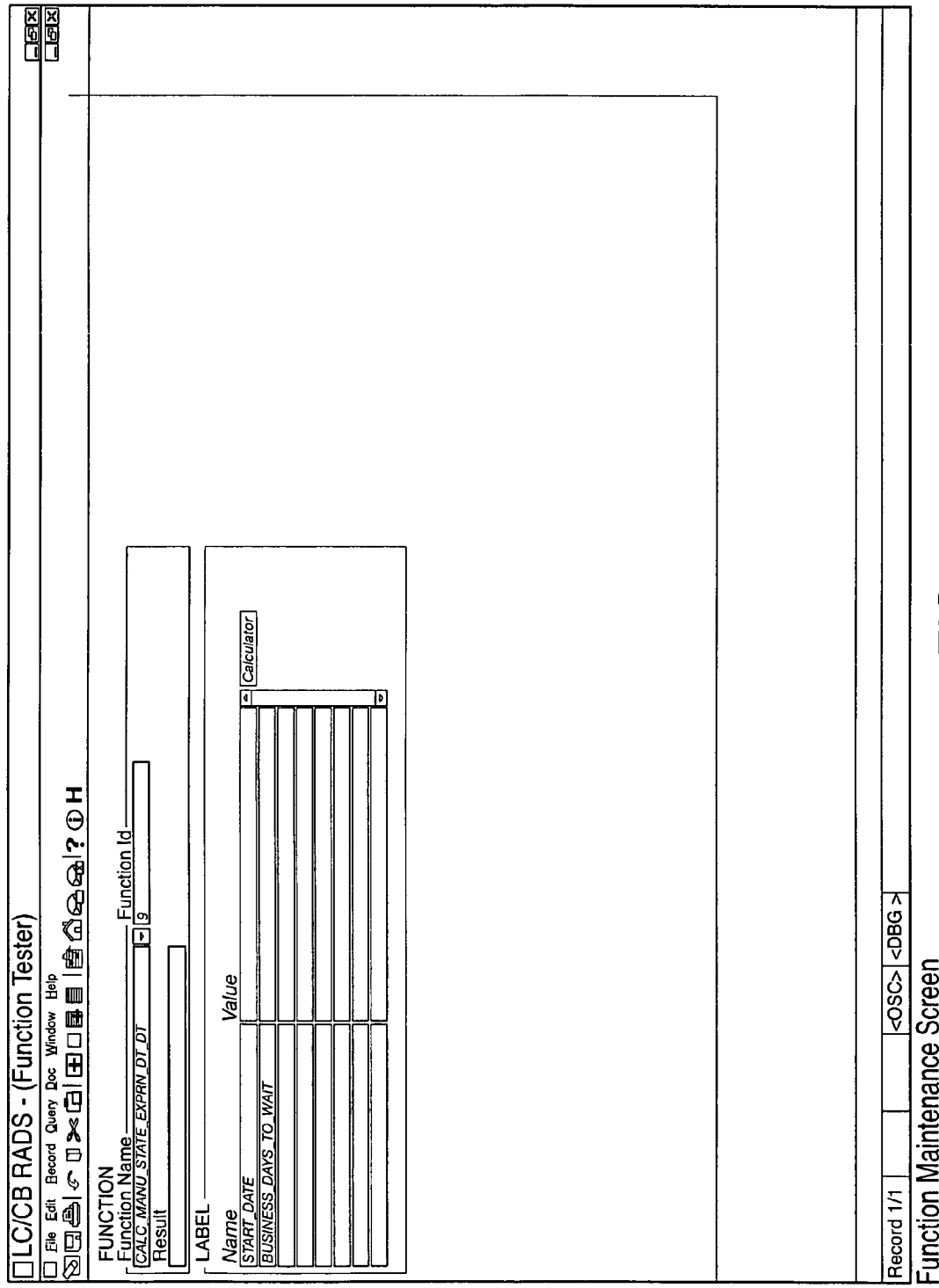
FIG. 6 is an example of a computer application which is used as the basis for the sample data to populate the tables in FIGS. 7-A to 7-K.

The following example illustrates how this process and computer system can be used in practice, using sample data. FIG. 6 is an example of an application called Function Maintenance. FIGS. 7-A to 7-D, 8A to 8F, 9A to 9C and 10A to 10D are examples of sample data in various of the entities and tables. More specifically, FIG. 6 is the Function Maintenance software application which is used as the basis for the sample data which populates the tables in FIGS. 7-A to 7-D, 8A to 8F, 9A to 9C and 10A to 10D.

FIG. 7A is an example of sample data in the Entity and Table entitled Tool;

FIG. 7B is an example of sample data in the Entity and Table entitled Def_Obj;

FIG. 7C is an example of sample data in the Entity and Table entitled Systm;

FIG. 7D is an example of sample data in the Entity and Table entitled Valid_Tool;

FIG. 7E is an example of sample data in the Entity and Table entitled Obj;

FIG. 7F is an example of sample data in the Entity and Table entitled Abstr_Obj;

FIG. 7G is an example of sample data in the Entity and Table entitled Lang;

FIG. 7H is an example of sample data in the Entity and Table entitled Label_Set;

FIG. 7I is an example of sample data in the Entity and Table entitled Domain;

FIG. 7J is an example of sample data in the Entity and Table entitled Def_Obj_Attr; and FIG. 7K is an example of sample data in the Entity and Table entitled Obj_Value.

With reference to FIG. 7A, the user has entered software application development products, that is, three tools: Oracle Forms, Oracle Reports, and Microsoft SQL Server.

With reference to FIG. 7B, the user has entered eleven defined objects, that is, eleven structural components of Oracle Forms, including forms, blocks, windows, canvases, tab pages, visual attributes, text items, display items, check-boxes, buttons, and radio groups. Contained within a form are blocks that include items. Forms also contain canvases and alerts. There are appropriate attributes associated with each of these types of objects. All of this information is stored in the first part of the repository, allowing it to work, not only for Oracle Forms, but also for any product used to generate forms. The only assumption is that the objects within the application are structured hierarchically.

With reference to FIG. 7C, the user has entered three systems: the Payroll System, the system called ABC Corp., and the Marketing Information System.

With reference to FIG. 7D, there are three valid tools: Forms for the Payroll System, Forms for ABC Corp. System, and Reports for ABC Corp. System.

With reference to FIGS. 8A to 8F, there are many objects. There are many names of each object, and each object is of a particular type, which is listed explicitly in the description field.

With reference to FIG. 9A, there are three abstract objects.

With reference to FIG. 9B, there are three languages, that is, three sets of multilingual labels that the system consists of: English, French, and German.

With reference to FIG. 9C, the user has specified three languages for the payroll system, English, French and German.

With reference to FIG. 9D, the user has specified two domains: money and small amount, which are of a numeric data type.

With reference to FIG. 9E, the user has entered fourteen defined object attributes. Defined object attribute allows a person to define the relevant attributes associated with each type of defined object. Here you need to list all attributes that you might want to override at run-time for any object. In Forms, for items, you might want to manipulate Prompt, Visual Attribute and Current Record Visual Attribute. In this particular example, the first one is a visual attribute for a canvas, and it is given explicitly in the description field.

With reference to FIGS. 10A to 10D, the user has entered many object values.

System defines all of the programs in the system and the objects in these programs that can be manipulated. For example, the Payroll System would have several forms with associated blocks, items, help messages, etc. Everything associated with the system is stored here.

Those of ordinary skill in the art will recognize that the embodiments just described merely illustrate the principles of the present invention. Many modifications may be made thereto without departing from the spirit and scope of the invention as set forth in the following claims.

I claim:

1. A method of defining and storing customization information of computer applications, in a single user or multiuser environment, comprising the steps of:

a) creating a tool by specifying a name and a description of the software development product and storing the name and the description of the software development product in a database table called Tool;
b) creating a plurality of defined objects, by specifying for each of the plurality of defined objects a name, a description, and a hierarchical structure, and storing the name, the description and the hierarchical structure of the plurality of defined objects in a database table called Def_Obj;
c) defining a system, by specifying a name, a password, a schema, a version number, and a description, and storing the name, the password, the schema, the version number and the description of the system in a database table called Systm;
d) defining a valid tool, by specifying which tool was used in developing the system and storing the valid tool in a database table called Valid_Tool;
e) defining an object, by specifying a particular system with a name Systm_ID, a particular defined object with a name Def_Obj_ID, a name, a description, and a hierarchical structure with a name Obj_ID_RFK, and storing the object in a database table called Obj;
f) defining a plurality of abstract objects, by specifying for each of the plurality of abstract objects a name, a description, an associated system, and the associated defined objects, and storing the name, the description, the associated system and the associated defined object for each of the plurality of abstract objects in a database table called Abstract Object;
g) defining a language, by specifying a name and a description and storing the name and the description of the language in a database table called Lang
h) defining a label set, by specifying a particular system, a particular language, a name, and a description and storing the language, the name, and the description of the label set in a database table called Label_Set;
i) defining a domain, by specifying a name, a default text, a default number, a default date, a data type, a length, a maximum, a minimum, a precision, a description, a valid rule, and a type of domain, and storing the name, the default text, the default number, the default date, the data type, the length, the maximum, the minimum, the precision, the description of the domain, the valid rule and the type of domain in a database table called Domain;
j) defining a plurality of defined object attributes, by specifying for each of the plurality of defined objects a particular domain, a particular defined object, a name and a description, and storing the domain, the particular defined object, the name and the description of each of the plurality of the defined object attributes in a database table called Def_Obj_Attr; and
k) defining a value of the object, by specifying either a particular object or a defined object or abstract object, a label set, defined object attributes, and either numerical or textual values, and storing the particular object or the defined object or the abstract object, the label set, the defined object attributes, the numerical value or the textual values of the value of the object in a database table called Obj_Value.

2. The method of claim 1 wherein the defining and storing of information in steps a through k therein inclusive, is used to customize a computer application for a particular language to be selected by a user.

3. The method of claim 1 wherein the defining and storing of information in steps a through k therein inclusive, is used to customize a computer application to provide context-sensitive or personalized error messages.

4. The method of claim 1 wherein the defining and storing of information in steps a through k therein inclusive, is used to customize a computer application to provide context-sensitive or personalized help messages.

5. The method of claim 1 wherein the defining and storing of information in steps a through k therein inclusive, is used to customize a computer application to provide field-level security.

6. The method of claim 1 wherein the defining and storing of information in steps a through k therein inclusive, is used to customize a computer application to support client preferences, namely client-specific display preferences.

* * * * *